(12) United States Patent
Kawabe et al.

(10) Patent No.: US 11,508,404 B1
(45) Date of Patent: Nov. 22, 2022

(54) MAGNETIC DISK DEVICE AND METHOD OF COMPENSATING FOR HARMONIC CORRESPONDING TO HARMONIC DISTURBANCE

(71) Applicants: Kabushiki Kaisha Toshiba, Tokyo (JP); Toshiba Electronic Devices & Storage Corporation, Tokyo (JP)

(72) Inventors: Takayuki Kawabe, Sagamihara Kanagawa (JP); Takeyori Hara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/580,506

(22) Filed: Jan. 20, 2022

(30) Foreign Application Priority Data

Sep. 8, 2021 (JP) .............................. JP2021-146119

(51) Int. Cl.
  *G11B 20/10* (2006.01)
  *G11B 5/596* (2006.01)
  *G11B 5/55* (2006.01)
(52) U.S. Cl.
  CPC ........ *G11B 5/59627* (2013.01); *G11B 5/5582* (2013.01); *G11B 5/5586* (2013.01)
(58) Field of Classification Search
  None
  See application file for complete search history.

(56) References Cited

U.S. PATENT DOCUMENTS

| | | | | |
|---|---|---|---|---|
| 4,286,318 A | * | 8/1981 | Immink | G05B 21/02 700/78 |
| 5,138,594 A | * | 8/1992 | Fennema | G11B 7/08541 369/44.29 |
| 6,055,219 A | * | 4/2000 | Ho | G11B 19/26 369/53.37 |
| 6,721,247 B2 | | 4/2004 | Watanabe | |
| 7,120,101 B2 | | 10/2006 | Watanabe | |
| 7,145,746 B1 | * | 12/2006 | Hirano | G11B 5/59627 360/77.04 |
| 7,265,934 B2 | | 9/2007 | Takaishi | |

(Continued)

FOREIGN PATENT DOCUMENTS

| | | |
|---|---|---|
| JP | H1-138661 A | 5/1989 |
| JP | H3-41678 A | 2/1991 |

(Continued)

*Primary Examiner* — Peter Vincent Agustin
(74) *Attorney, Agent, or Firm* — Allen & Overy LLP

(57) ABSTRACT

According to one embodiment, a magnetic disk device includes a disk, a head that writes data to the disk and reads data from the disk, an actuator that is rotationally driven and controls movement of the head mounted on the disk, and a controller that estimates a fundamental frequency of a position error signal generated in positioning control of the head, the fundamental frequency corresponding to a disturbance having harmonics, determines the fundamental frequency, determines the number of delay samples based on the fundamental frequency, and suppresses a multiplied frequency that is a harmonic of the fundamental frequency according to the number of the delay samples.

20 Claims, 19 Drawing Sheets

(56) References Cited

U.S. PATENT DOCUMENTS

| | | | |
|---|---|---|---|
| 7,835,236 B2 | 11/2010 | Ishimoto | |
| 8,098,038 B2 | 1/2012 | Okita et al. | |
| 8,817,414 B1 * | 8/2014 | Wu | G11B 20/10009 |
| | | | 360/77.11 |
| 9,286,927 B1 * | 3/2016 | Tang | G11B 5/59655 |
| 10,497,385 B1 * | 12/2019 | Matsuzawa | G11B 5/59694 |
| 10,839,842 B1 | 11/2020 | Cao et al. | |
| 2001/0043427 A1 * | 11/2001 | Chen | G11B 5/5521 |
| | | | 360/77.02 |
| 2009/0296265 A1 | 12/2009 | Kisaka et al. | |
| 2012/0033323 A1 * | 2/2012 | Mathew | G11B 5/6029 |
| | | | 360/110 |

FOREIGN PATENT DOCUMENTS

| | | |
|---|---|---|
| JP | H6-203500 A | 7/1994 |
| JP | 2001-126421 A | 5/2001 |
| JP | 2009-289373 A | 12/2009 |
| JP | 2020-042871 A | 3/2020 |

* cited by examiner

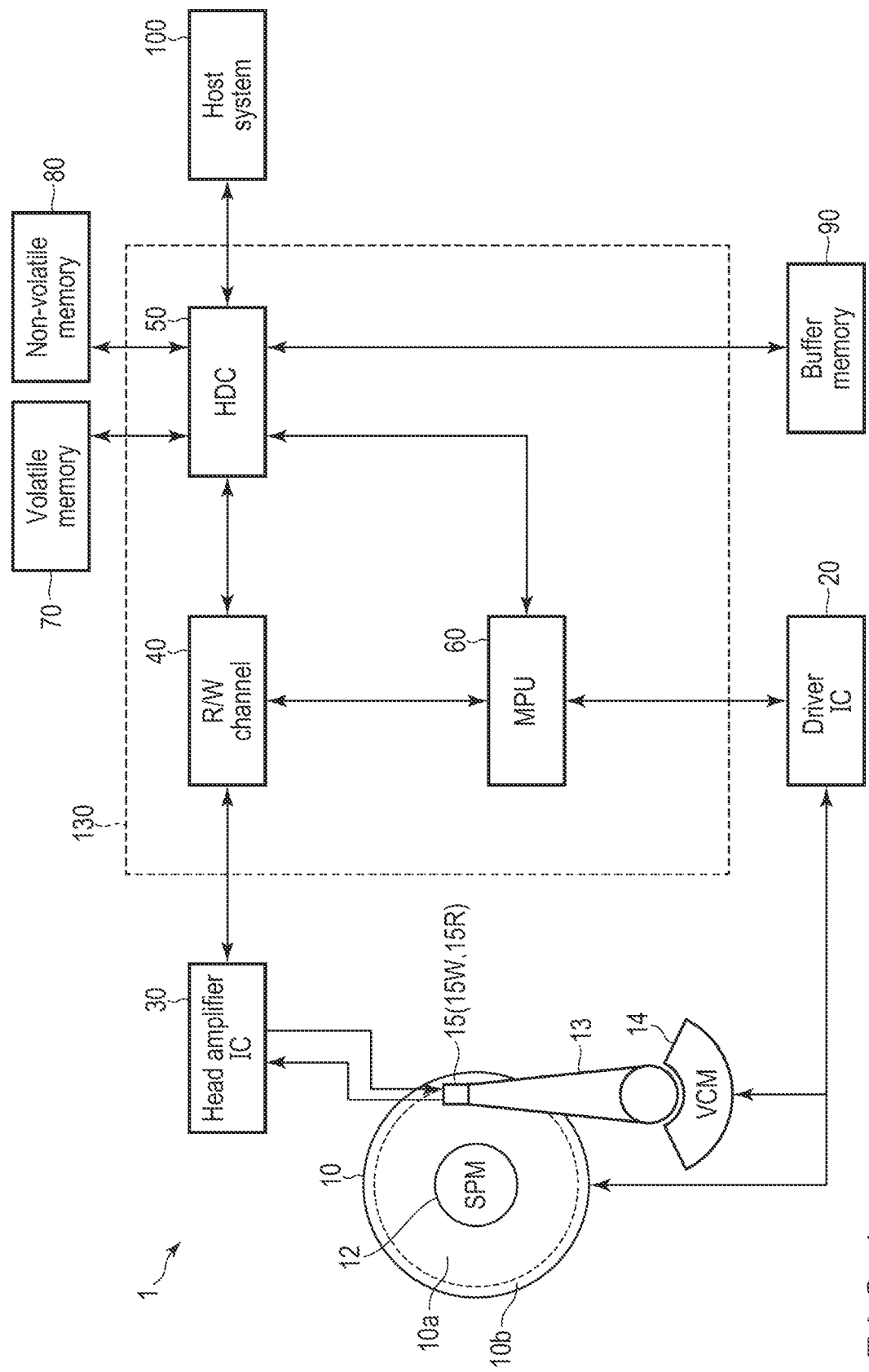
F I G. 1

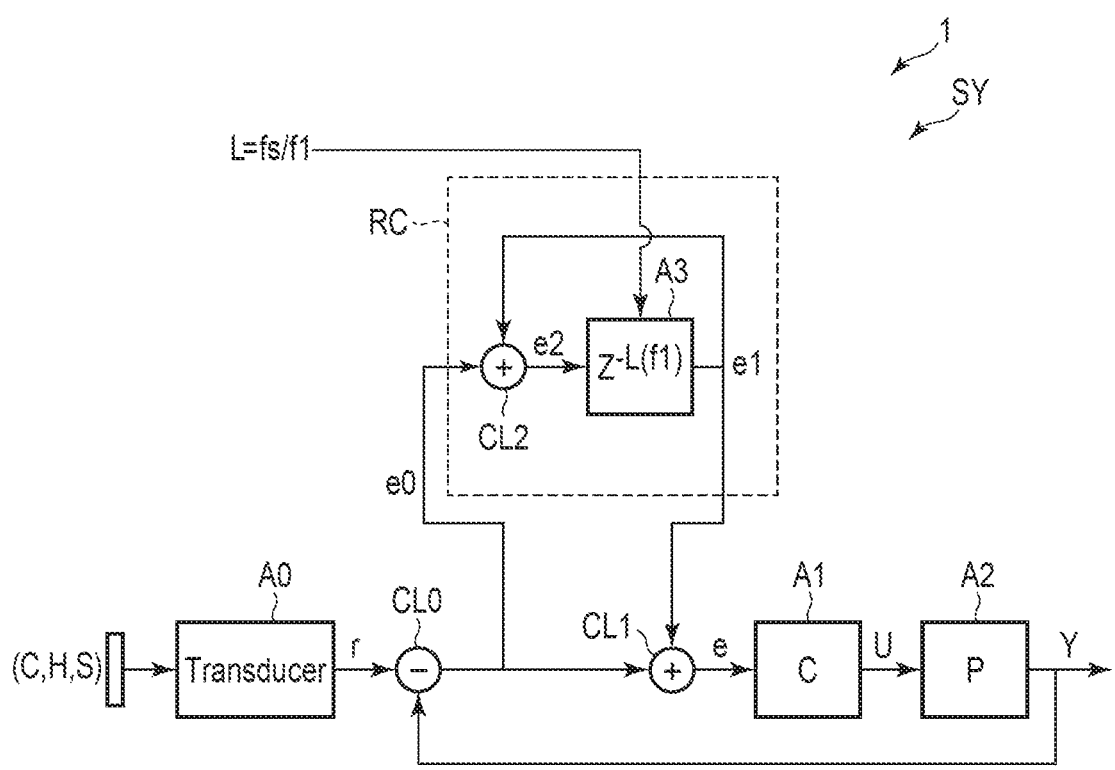
F I G. 3

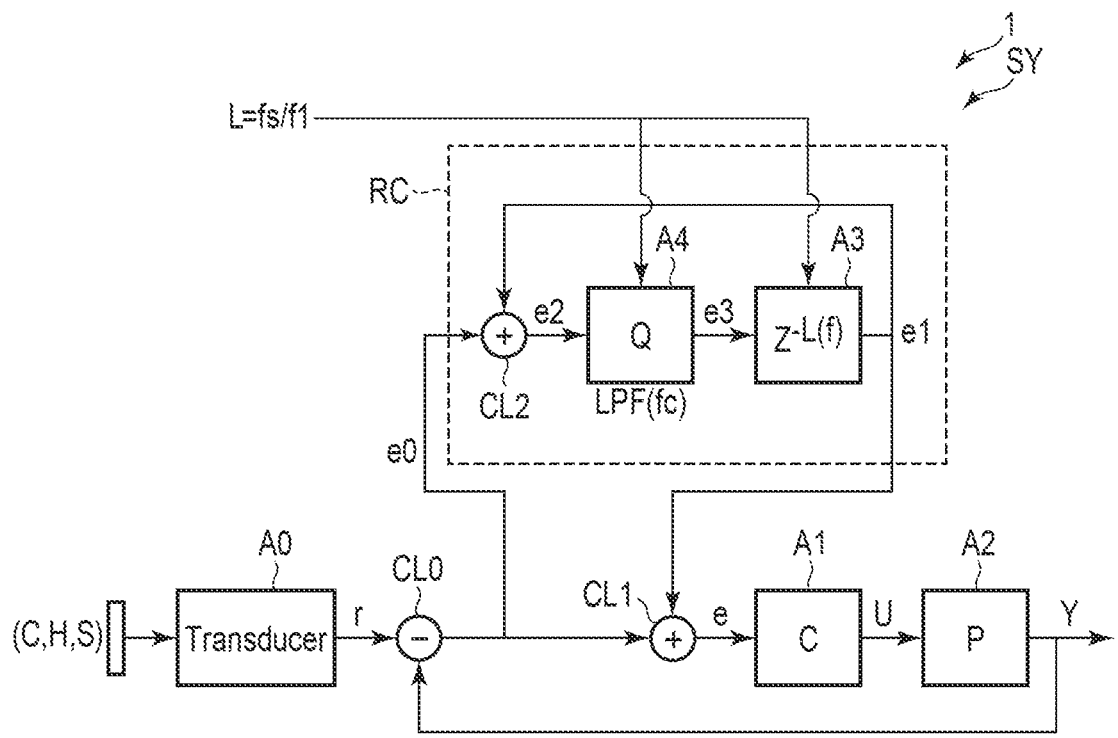
F I G. 5
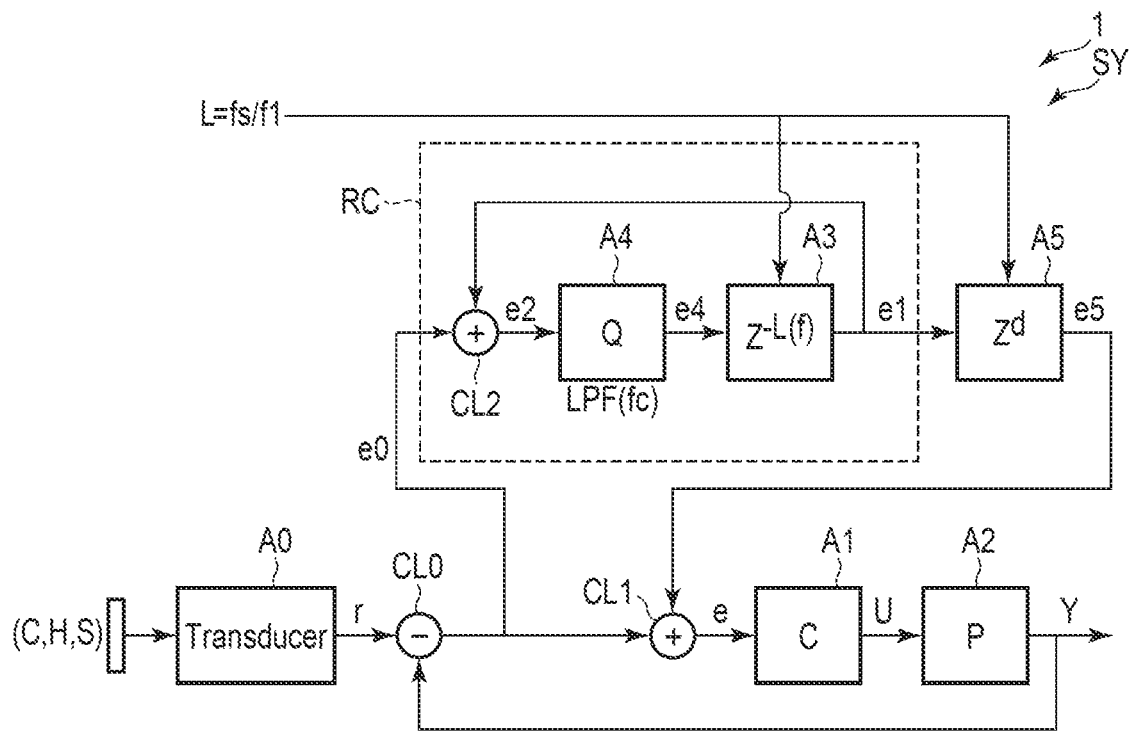
F I G. 6

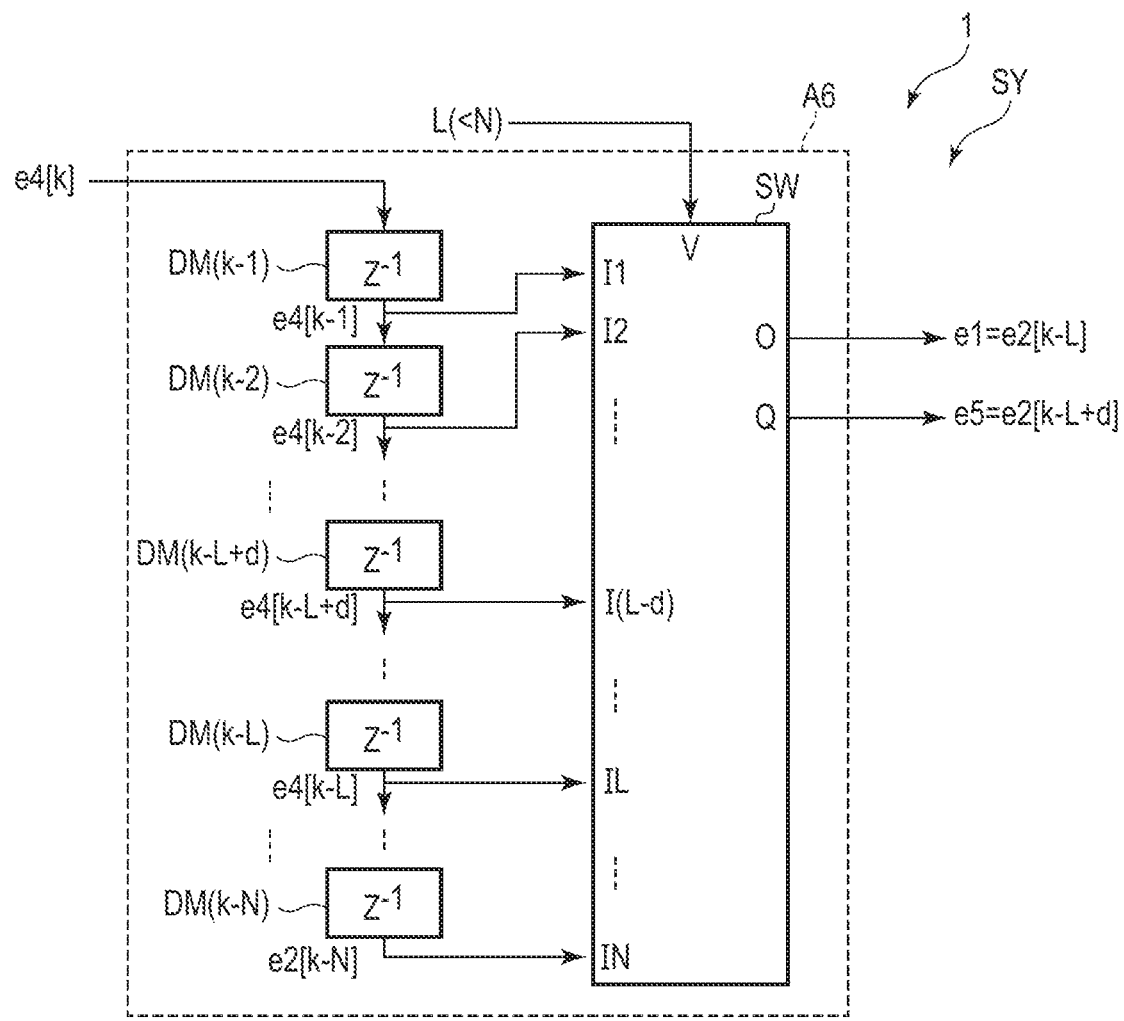
F I G. 8

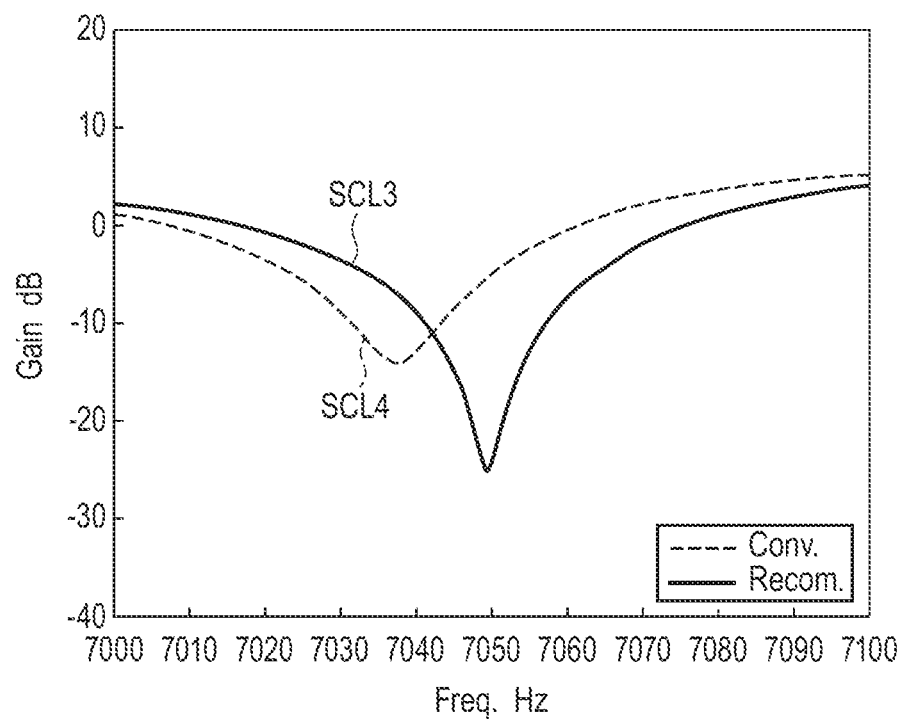
F I G. 20
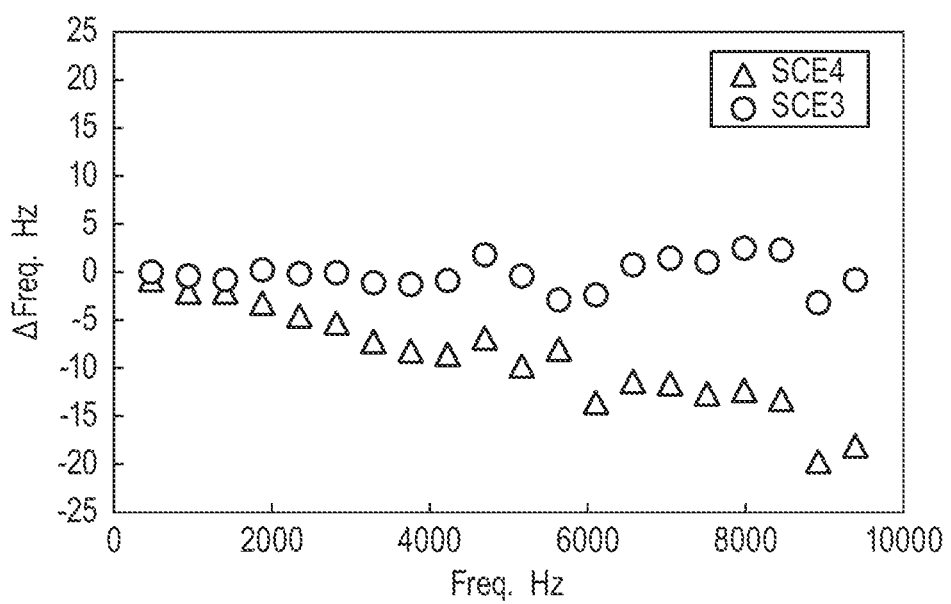
F I G. 21

MAGNETIC DISK DEVICE AND METHOD OF COMPENSATING FOR HARMONIC CORRESPONDING TO HARMONIC DISTURBANCE

CROSS-REFERENCE TO RELATED APPLICATIONS

This application is based upon and claims the benefit of priority from Japanese Patent Application No. 2021-146119, filed Sep. 8, 2021, the entire contents of which are incorporated herein by reference.

FIELD

Embodiments described herein relate generally to a magnetic disk device and a method of compensating for a harmonic corresponding to a harmonic disturbance.

BACKGROUND

A magnetic disk device controls positioning of a head in a radial direction of a magnetic disk (hereinafter, simply referred to as a disk) by an actuator so that the head is disposed on a track extending in the circumferential direction of the disk.

A magnetic disk device detects an error between a position of a head on a disk and a track of the disk as a target as a position error signal (or positioning error signal) when a disturbance such as vibration or impact is externally applied to an actuator on which the head is mounted and a base having the disk. The magnetic disk device performs positioning control by a feedback loop that makes the position error signal zero.

In recent years, a large-scale storage system on which several tens to several hundreds of magnetic disk devices are mounted has been configured. In the large-scale storage system, a system FAN for cooling a large number of magnetic disk devices is mounted in addition to a CPU for system control and a peripheral circuit.

The system FAN rotates at a high speed in order to obtain a flow rate of air necessary for efficiently exchanging air in the system rack. Since the system FAN generates a vibration sound and a wind noise of the bearing, the system FAN vibrates the base of the magnetic disk device by the sound pressure, and can deteriorate a position error signal (PES) corresponding to a position error signal of the head. In many cases, in the system FAN, the system side autonomously controls the flow rate of air, that is, the FAN rotational speed by monitoring the internal temperature, and thus, the frequency of the PES deteriorated according to the control (or change) of the rotational speed of the FAN changes. In addition, the PES deteriorated by the rotation of the system FAN may include many harmonics of the fundamental frequency. In order to suppress the harmonics of the fundamental frequency of the PES deteriorated by the rotation of the system FAN, it is necessary to configure a multistage loop shaping filter. When the number of stages of the loop shaping filter increases, there may be a problem that a memory capacity is compressed and a lot of filter operation time is required in order to realize the loop shaping filter with firmware.

BRIEF DESCRIPTION OF THE DRAWINGS

FIG. 1 is a block diagram showing a configuration of a magnetic disk device according to a first embodiment.

FIG. 3 is a block diagram illustrating an example of a head positioning control system during an access process according to the first embodiment.

FIG. 5 is a block diagram illustrating an example of a head positioning control system during the access process according to the first embodiment.

FIG. 6 is a block diagram illustrating an example of a head positioning control system during the access process according to the first embodiment.

FIG. 8 is a block diagram illustrating an example of a variable delay memory unit of the repetitive control system illustrated in FIG. 7.

FIG. 20 is an enlarged view illustrating an enlarged waveform of a frequency in the vicinity of a frequency which is the 15th order harmonic of the target suppression fundamental frequency in FIG. 18.

FIG. 21 is a diagram illustrating a suppression frequency error between the frequency of the harmonic suppressed in the change in the sensitivity characteristic with respect to the two frequencies illustrated in FIGS. 18, 19, and 20 and the target suppression frequency.

DETAILED DESCRIPTION

Figure 2:
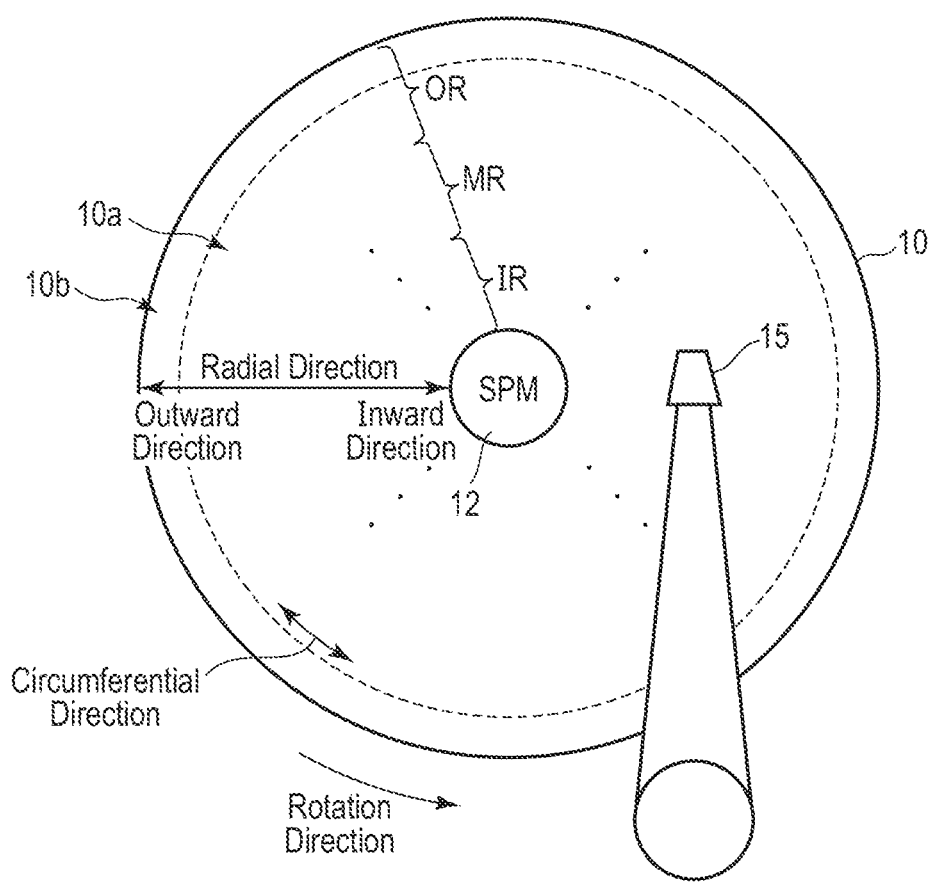
FIG. 2 is a schematic view showing an example of a disk according to the first embodiment.

In general, according to one embodiment, a magnetic disk device comprises: a disk; a head that writes data to the disk and reads data from the disk; an actuator that is rotationally driven and controls movement of the head mounted on the disk; and a controller that estimates a fundamental frequency of a position error signal generated in positioning control of the head, the fundamental frequency corresponding to a disturbance having harmonics, determines the fundamental frequency, determines the number of delay samples based on the fundamental frequency, and suppresses a multiplied frequency that is a harmonic of the fundamental frequency according to the number of the delay samples.

Hereinafter, embodiments will be described with reference to the drawings. It should be noted that the drawings are merely examples and do not limit the scope of the invention.

First Embodiment

FIG. 1 is a block diagram showing an example of a configuration of a magnetic disk device 1 according to a first embodiment.

The magnetic disk device 1 includes a head disk assembly (HDA), a driver IC 20, a head amplifier integrated circuit (hereinafter referred to as a head amplifier IC or a preamplifier) 30, a volatile memory 70, a non-volatile memory 80, a buffer memory (buffer) 90, and a system controller 130 which is an integrated circuit of one chip. Further, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the SPM 12 and is rotated by the drive of the SPM 12. The arm 13 and the VCM 14 constitute an actuator. The actuator controls the movement of the head 15 mounted on the arm 13 to a particular position of the disk 10 by driving the VCM 1.4. The two or more disks 10 and the two or more heads 15 may be provided.

In the disk 10, a user data region 10a that can be used by a user in a region in which the data can be written, and a system area 10b in which information necessary for the system management is written are allocated. Hereinafter, the direction from the inner circumference to the outer circumference of the disk 10 or the direction from the outer circumference to the inner circumference of the disk 10 is referred to as a radial direction. In the radial direction, the direction from the inner circumference to the outer circumference is referred to as the outward direction (or outside), and the direction from the outer circumference to the inner circumference is referred to as the inward direction (or inside). The circumferential direction corresponds to the direction along the circumference of the disk 10. The radial direction and the circumferential direction are orthogonal to each other. Further, a particular position of the disk 10 in the radial direction may be referred to as a radial position, and a particular position of the disk 10 in the circumferential direction may be referred to as a circumferential position. The radial position and the circumferential position may be collectively referred to as a position. The user da-a region 10a of the disk 10 can be divided into a plurality of regions.

For example, the user data region 10a can be divided for each region (hereinafter, may be referred to as a zone) including a particular number of tracks in the radial direction. The zones may be divided for each track in the radial direction.

The "track" is used in various meanings including one recording area among a plurality of recording areas obtained by dividing the disk 10 in the radial direction, a recording area for one turn at a particular radial position of the disk 10, a particular recording region at a particular radial position of the disk 10, a recording area extending in a circumferential direction of the disk 10, a recording area corresponding to a path of the head 15 positioned at a particular radial position of the disk 10, a path of the head 15 positioned at a particular radial position of the disk 10, data written to one recording area among a plurality of recording areas obtained by dividing the disk 10 in the radial direction, data written to a recording area for one turn at a particular radial position of the disk 10, data written to a particular recording region at a particular radial position of the disk 10, data written to a recording area extending in the circumferential direction of the disk 10, data written to a recording area corresponding to a path of the head 15 positioned at a particular radial position of the disk 10, data written along the path of the head 15 positioned at a particular radial position of the disk 10, data extending in the circumferential direction of the disk 10, data written to a particular track of the disk 10, data for one turn written to a particular track of the disk 10, part of data written to a particular track of the disk 10, and others. The "sector" is used in various meanings including one recording area among a plurality of recording areas obtained by dividing a particular track of the disk 10 in the circumferential direction, one recording area among a plurality of recording areas obtained by dividing a recording area extending in a circumferential direction at a particular radial position of the disk 10, a particular recording region of a particular track of the disk 10, a particular circumferential position of a particular track of the disk 10, a particular circumferential position (particular position) at a particular radial position of the disk 10, data written to one recording area among a plurality of recording areas obtained by dividing a particular track of the disk 10 in the circumferential direction, data written in one recording area of a plurality of recording areas obtained by dividing the recording area extending in the circumferential direction at a particular radial position of the disk 10, data written in a particular recording region of a particular track of the disk 10, data written at a particular circumferential position of a particular track of the disk 10, data written at a particular circumferential position (particular position) at a particular radial position of the disk 10, data written to a particular sector, and others. The "radial width of the track" may be referred to as a "track width". "A path that passes through the center position of the track width in a particular track" is referred to as a "track center". The data available by the user written to the user data region 10a may be referred to as user data.

The head 15 has a slider as a main body, and has a write head 15W and a read head 15R mounted on the slider. The write head 15W writes data to the disk 10. The read head 15R reads the data recorded on the disk 10. In addition, the "write head 15W" may be simply referred to as the "head 15", the "read head 15R" may be simply referred to as the "head 15", and the "write head 15W and read head 15R" may be collectively simply referred to as the "head 15". The "center of the head 15" may be referred to as the "head 15", the "center of the write head 15W" may be referred to as the "write head 15W", and the "center of the read head 15R" may be referred to as the "read head 15R". The "center of the write head 15W" may be simply referred to as the "head 15", and the "center of the read head 15R" may be simply referred to as the "head 15". "Positioning the center of the head 15 to the track center of a particular track" may be expressed as "positioning the head 15 to a particular track", "disposing the head 15 on a particular track", or "locating the head 15 on a particular track".

FIG. 2 is a schematic view showing an example of the disk 10 according to the present embodiment. As shown in FIG. 2, the direction in which the disk 10 rotates in the circumferential direction is referred to as a rotation direction. In the example shown in FIG. 2, the rotation direction is shown counterclockwise, but it may be in the opposite direction (clockwise). In FIG. 2, the disk 10 is divided into an inner circumference region IR located inward, an outer circumference region OR located outward, and a middle circumference region MR located between the inner circumference region IR and the outer circumference region OR.

In the example shown in FIG. 2, the disk 10 includes the user data region 10a and the system area 10b. In FIG. 2, the user data region 10a and the system area 10b are adjacent in the radial direction. Here, "adjacent" includes not only a state in which data, an object, a region, a space, and the like are disposed in contact with each other, but also a state in which they are disposed at a particular interval. In FIG. 2, the system area 10b is disposed adjacent to the user data region 10a in the outward direction. Note that the system area 10b may be adjacent to the user data region 10a in the inward direction. Further, the system area 10b may be disposed between the user data regions 10a in the radial direction.

In the example shown in FIG. 2, the user data region 10a is disposed from the inner circumference region IR to the outer circumference region OR. The system area 10b is disposed in the outer circumference region OR. The system area 10b may be disposed in the inner circumference region IR or the middle circumference region MR. The system area 10b may be dispersedly disposed in the outer circumference region OR, the middle circumference region MR, or the inner circumference region IR.

As shown in FIG. 2, the head 15 is driven by the VCM 14 with respect to the disk 10 to rotate around the rotation axis, moves from the inward direction to the outward direction to be disposed at a particular position, or moves from the outward direction to the inward direction to be disposed at a particular position.

The driver IC 20 controls the driving of the SPM 12 and the VCM 14 under the control of the system controller 130 (more specifically, the MPU 60 described later).

The head amplifier IC (preamplifier) 30 includes a read amplifier and a write driver. The read amplifier amplifies the read signal read from the disk 10 to output it to the system controller 130 (more specifically, a read/write (R/W) channel 40 to be described later). The write driver outputs, to the head 15, a write current corresponding to the write data output from the R/W channel 40.

The volatile memory 70 is a semiconductor memory from which stored data is lost when power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The non-volatile memory 80 is a semiconductor memory that records data stored even when power supply is cut off. The non-volatile memory 80 is, for example, a NOR type or NAND type flash read only memory (FROM).

The buffer memory 90 is a semiconductor memory that temporarily records data and the like transmitted and received between the magnetic disk device 1 and a host 100. It is to be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using a large scale integrated circuit (LSI) referred to as the System-on-a-Chip (SoC) in which a plurality of elements is integrated on a single chip, for example. The system controller 130 includes a read/write (R/W) channel 40, a hard disk controller (HDC) 50, a microprocessor (MPU) 60, and the like. The R/W channel 40, the HDC 50, and the MPU 60 are electrically connected to each other. The system controller 130 is electrically connected to the driver IC 20, the head amplifier IC 30, the volatile memory 70, the non-volatile memory 80, the buffer memory 90, and the host 100, for example.

In response to an instruction from the MPU 60 to be described later, the R/W channel 40 performs the signal process of data transferred from the disk 10 to the host 100, for example, read data and data transferred from the host 100, for example, write data. The R/W channel 40 has a circuit or a function for measuring a signal quality of read data. The R/W channel 40 is electrically connected to the head amplifier IC 30, the HDC 50, the MPU 60, and the like, for example.

The HDC 50 controls data transfer. For example, in response to an instruction from the MPU 60 to be described later, the HDC 50 controls data transfer between the host 100 and the R/W channel 40. The HDC 50 is electrically connected to, for example, the R/W channel 40, the MPU 60, the volatile memory 70, the non-volatile memory 80, the buffer memory 90, and the like.

The MPU 60 is a main controller that controls respective units of the magnetic disk device 1. The MPU 60 controls the VCM 14 via the driver IC 20 and executes servo control that positions the head 15. The MPU 60 also controls the SPM 12 via the driver IC 20 to rotate the disk 10. The MPU 60 controls a write operation of the data to the disk 10 and selects the storage destination of the data, for example, write data, transferred from the host 100. The MPU 60 controls the read operation of the data from the disk 10 and controls the process of the data transferred from the disk 10 to the host 100, for example, read data. The MPU 60 also manages a region for recording data. The MPU 60 is connected to each part of the magnetic disk device 1. The MPU 60 is electrically connected to the driver IC 20, the R/W channel 40, the HDC 50, and the like, for example.

The MPU 60 controls a read process of reading data from the disk 10 and a write process of writing data to the disk 10 according to a command or the like from the host 100. The MPU 60 controls the VCM 14 via the driver IC 20, positions the head 15 at a particular position on the disk 10, and performs the read process or the write process. Hereinafter, the term "access" may be used in a meaning including recording or writing data to a particular region (or write process), reading out or reading data from a particular region (or read process), or moving the head 15 or the like to a particular region.

The MPU 60 applies positioning control of the head 15 in a radial direction of the disk 10 by an actuator so that the head 15 follows a target track (hereinafter, may be referred to as a target track) of the disk 10. Hereinafter, a system that applies this positioning control may be referred to as a positioning control system.

The MPU 60 has a positioning control system. For example, the MPU 60 has a positioning control system that detects a position error signal corresponding to an error of the position of the head 15 with respect to the target track and forms a feedback loop so as to make the detected position error signal zero when disturbance such as vibration and impact is applied from the outside of the magnetic disk device 1 to a base of the magnetic disk device 1 on which an actuator and the disk 10 are mounted.

The MPU 60 includes a filter that suppresses a disturbance with at least one frequency (or component) of a position error signal (PES) that is a position error signal generated by application of a disturbance.

For example, the MPU 60 includes a filter capable of suppressing (suppressing or compensating) (an estimated value of) a fundamental frequency of a PES generated in positioning control corresponding to a disturbance (hereinafter, may be referred to as a harmonic disturbance) having a harmonic generated by application to a base or the like of a disturbance such as vibration and impact due to a sound pressure of a vibration sound or a wind noise of a bearing generated from a system FAN that cools many, for example, tens to hundreds of magnetic disk devices mounted on a large-scale storage system and a harmonic (hereinafter, may be referred to as harmonics) of (an estimated value of) the fundamental frequency, and changing (being variable) the number of delay samples of a repetitive control system according to (an estimated value of) a fundamental frequency of a PES generated in positioning control corresponding to a harmonic disturbance generated due to rotation of the system FAN and a servo sample (sampling) frequency. The repetitive control system sequentially outputs internal models of signals that are periodically repeated. The internal model is updated by, for example, the sum of the output one period before (or at present) and the latest input value. The internal model includes, for example, a fundamental component of a fundamental frequency of a PES generated in positioning control corresponding to a harmonic disturbance and a multiplication component of the fundamental frequency.

Hereinafter, "suppress (an estimated value of) the fundamental frequency of a PES generated in positioning control corresponding to a harmonic disturbance and harmonics of (the estimated value of) the fundamental frequency" may be referred to as "compensate for a harmonic disturbance". "Suppress harmonics of (an estimated value of) the fundamental frequency of a PES generated in positioning control corresponding to a harmonic disturbance" may be referred to as "compensate for a harmonic disturbance".

"(An estimated value of) the fundamental frequency of a PES generated in positioning control corresponding to a harmonic disturbance" may also be referred to as a "(an estimated value of) the fundamental frequency corresponding to a harmonic disturbance". "(An estimated value) of a harmonic of (an estimated value of) the fundamental frequency of a PES generated in positioning control corresponding to a harmonic disturbance" may also be referred to as "(an estimated value of) a harmonic of (an estimated value of) the fundamental frequency corresponding to a harmonic disturbance".

Furthermore, "suppress (an estimated value of) the fundamental frequency of a PES generated in positioning control corresponding to a harmonic disturbance and harmonics of (an estimated value of) the fundamental frequency" may be referred to as "suppress (an estimated value of) the fundamental frequency corresponding to a harmonic disturbance". "Suppress (an estimated value of) the fundamental frequency of a PES generated in positioning control corresponding to a harmonic disturbance and harmonics of (an estimated value of) the fundamental frequency" may be referred to as "suppress harmonics of (an estimated value of) the fundamental frequency corresponding to a harmonic disturbance".

When the compensation for the harmonic disturbance is not executed, the MPU 60 estimates (the fundamental frequency corresponding to) the harmonic disturbance and detects the harmonic disturbance. When determining that the harmonic disturbance is detected, the fundamental frequency corresponding to the detected harmonic disturbance is determined, and the number of delay samples is determined based on the fundamental frequency corresponding to the harmonic disturbance. The MPU 60 clears the sample value stored (or recorded) in the recording area of the repetitive control unit, for example, to 0 (zero), and starts outputting the sample value (hereinafter, may be referred to as a delay sample value) corresponding to the number of delay samples from the repetitive control unit. The MPU 60 updates the sample value stored (or recorded) in the recording area of the repetitive control unit.

When the number of delay samples has already been determined and compensation for the harmonic disturbance has been executed, the MPU 60 outputs a delay sample value from the repetitive control unit and updates the sample value stored (or recorded) in the recording area of the repetitive control unit.

Further, when the number of delay samples has already been determined and the compensation for the harmonic disturbance has been executed, the MPU 60 determines whether the harmonic disturbance for which the compensation is executed has changed. When determining that the harmonic disturbance for which the compensation is executed has changed, the MPU 60 estimates (the fundamental frequency corresponding to) the changed harmonic disturbance, compares the estimated fundamental frequency corresponding to the harmonic disturbance with the fundamental frequency corresponding to the harmonic disturbance that is being compensated for, and determines whether the fundamental frequency corresponding to the changed harmonic disturbance has changed. When determining that the fundamental frequency has changed, the MPU 60 re-estimates (the fundamental frequency corresponding to) the harmonic disturbance, re-determines the fundamental frequency corresponding to the changed harmonic disturbance, and re-determines the number of delay samples based on the re-determined fundamental frequency corresponding to the harmonic disturbance.

FIG. 3 is a block diagram illustrating an example of a positioning control system SY of the head 15 at the time of the access process according to the present embodiment.

The magnetic disk device 1 includes the positioning control system SY of the head 15 at the time of the access process. The positioning control system SY includes a transducer A0, a control unit A1, an actuator A2, a repetitive control system RC, and arithmetic units CL0 and CL1. The repetitive control system RC includes a variable delay memory unit A3 and an arithmetic unit CL2. The transducer A0, the control unit A1, the actuator A2, the repetitive control system RC, the arithmetic unit CL0, and the arithmetic unit CL1 are included in, for example, the system controller 130, the driver IC 20, the head amplifier IC 30, the disk 10, the volatile memory 70, the non-volatile memory 80, and the buffer memory 90. The actuator A2 includes, for example, an arm 13, a VCM 14, and the like. The positioning control system SY constitutes a feedback system. As the actuator A2, a plurality of actuators having two or more degrees of freedom may be used, or a plurality of control units corresponding to the respective actuators may be used.

In FIG. 3, a sector (hereinafter, may be referred to as a target sector) (C, H, S) as a target in which the head 15 is disposed in a particular track (cylinder) of the disk 10, a position error signal (or PES) e0 corresponding to a difference between a target radial position (hereinafter, may be referred to as a target radial position) r of the head 15 and an actual position (hereinafter, may be referred to as an actual position) Y of the head 15, a repetitive control signal (hereinafter, may be referred to as a delay memory output signal) e1 corresponding to an internal state $z\textasciicircum(-L)\times e2$ delayed by the number of delay samples L corresponding to a ratio of a servo sample frequency fs to (an estimated value of) an estimated fundamental frequency f1 of the harmonic disturbance, a repetitive control signal (hereinafter, may be referred to as a delay memory input signal or an internal state signal) e2 obtained by adding the position error signal e0 and the delay memory output signal e1, a position error signal e obtained by adding the position error signal e, and the delay memory output signal e1, a drive amount U of the actuator A2 in the target sector, and an actual position Y of the head 15 are processed as signals (or information) in the positioning control system SY. The number of delay samples L is an integer value corresponding to the ratio of the servo sample frequency fs to (the estimated value of) the fundamental frequency f1. The number of delay samples L is calculated as a round integer value by rounding off the ratio of the servo sample frequency fs to (the estimated value of) the fundamental frequency f1. The number of delay samples L may be calculated as a round-down integer value by discarding the ratio of the servo sample frequency fs to (the estimated value of) the fundamental frequency f1, or may be calculated as a round-up integer value by rounding up.

The transducer A0 converts a physical position (hereinafter, referred to as a physical position) corresponding to a logical position (hereinafter, referred to as a logical position) of the disk 10 designated by a host device, for example, the host 100, into a radial position (target radial position) of the disk 10. The logical position may be, for example, a logical block address (LBA). The physical position may be, for example, a servo information array indicating the physical position of the disk 10. For example, when receiving an access command to a target sector (C, H, S) from the host 100 or the like, the transducer A0 converts the target sector (C, H, S) to the target radial position r of the head 15. The transducer A0 is connected to the arithmetic unit CL0. The arithmetic unit CL0 is connected to the repetitive control system RC, for example, the arithmetic unit CL2 and the arithmetic unit CL1.

The control unit A1 controls the actuator A2. The control unit A1 generates the drive amount U of the head 15 of the actuator A2 based on, for example, the position error signal e. The control unit A1 is connected to the arithmetic unit CL1 and the actuator A2.

The actuator A2 is driven according to the output of the control unit A1. The actuator A2 is driven based on the drive amount U, for example, and moves the head 15 to the actual position Y. The actuator A2 is connected to the control unit A1 and the arithmetic unit CL0.

The repetitive control system RC sequentially outputs internal models of signals that are periodically repeated. The repetitive control system RC stores the delay memory input signal e2 obtained by adding the delay memory output signal e1 to the position error signal e0. The repetitive control system RC acquires the delay memory output signal e1 based on the number of delay samples L calculated by rounding off the ratio between (the estimated value of) the fundamental frequency f1 corresponding to the estimated harmonic disturbance and the servo sample frequency fs, and the delay memory input signal e2. The repetitive control system FC outputs the acquired delay memory output signal e1. The arithmetic unit CL2 is connected to the arithmetic unit CL0 and the variable delay memory unit A3. The variable delay memory unit A3 is connected to the arithmetic unit CL2 and the arithmetic unit CL1. The arithmetic unit CL1 is connected to the variable delay memory unit A3, the arithmetic unit CL0, and the control unit A1.

When the logical, position of the disk 10 to be accessed, for example, the LBA, is designated by the host device, for example, the host 100, the positioning control system SY converts the LBA into a physical position (C, H, S) in advance, and outputs the radial position (C, H, S) of the head 15 to the transducer A0. The physical position (C, H, S) of the head 15 is input to the transducer A0. The transducer A0 converts the physical position (C, H, S) of the head 15 into the target radial position r of the head 15. The transducer A0 outputs the target radial position r of the head 15 to the arithmetic unit CL0. The target radial position r of the head 15 and the actual position Y of the head 15 are input to the arithmetic unit CL0. The arithmetic unit CL0 calculates a position error signal e0 corresponding to a difference between the target radial position r of the head 15 and the actual position Y of the head 15. The arithmetic unit CL0 repeatedly outputs the position error signal e0 to the repetitive control system RC and the arithmetic unit CL. In other words, the arithmetic unit CL0 outputs the position error signal e0 to the arithmetic unit CL2 and the arithmetic unit CL1.

The arithmetic unit CL2 receives the position error signal e0 and the delay memory output signal e1. The arithmetic unit CL2 calculates the delay memory input signal e2 obtained by adding the position error signal e0 and the delay memory output signal e1. The arithmetic unit CL2 outputs the delay memory input signal e2 to the variable delay memory unit A3.

The variable delay memory unit A3 receives the number of delay samples L and the delay memory input signal e2. The variable delay memory unit A3 acquires the delay memory output signal e1 based on the number of delay samples L and the delay memory input signal e2. The variable delay memory unit A3 outputs the delay memory output signal e1 to the arithmetic unit CL1 and the arithmetic unit CL2.

The arithmetic unit CL1 receives the position error signal e0 and the delay memory output signal e1. The arithmetic unit CL1 calculates the position error signal e obtained by adding the position error signal e0 and the delay memory output signal e1. The arithmetic unit CL1 outputs the position error signal e to the control unit A1.

The position error signal e is input to the control unit A1. The control unit A1 generates the drive amount U based on the position error signal e. The control unit A1 outputs the drive amount U to the actuator A2.

The drive amount U is input to the actuator A2. The actuator A2 is driven according to the drive amount U, and moves the head 15 to the actual position Y corresponding to the drive amount U. The actuator A2 outputs the actual position Y to the arithmetic unit CL0.

Figure 4:
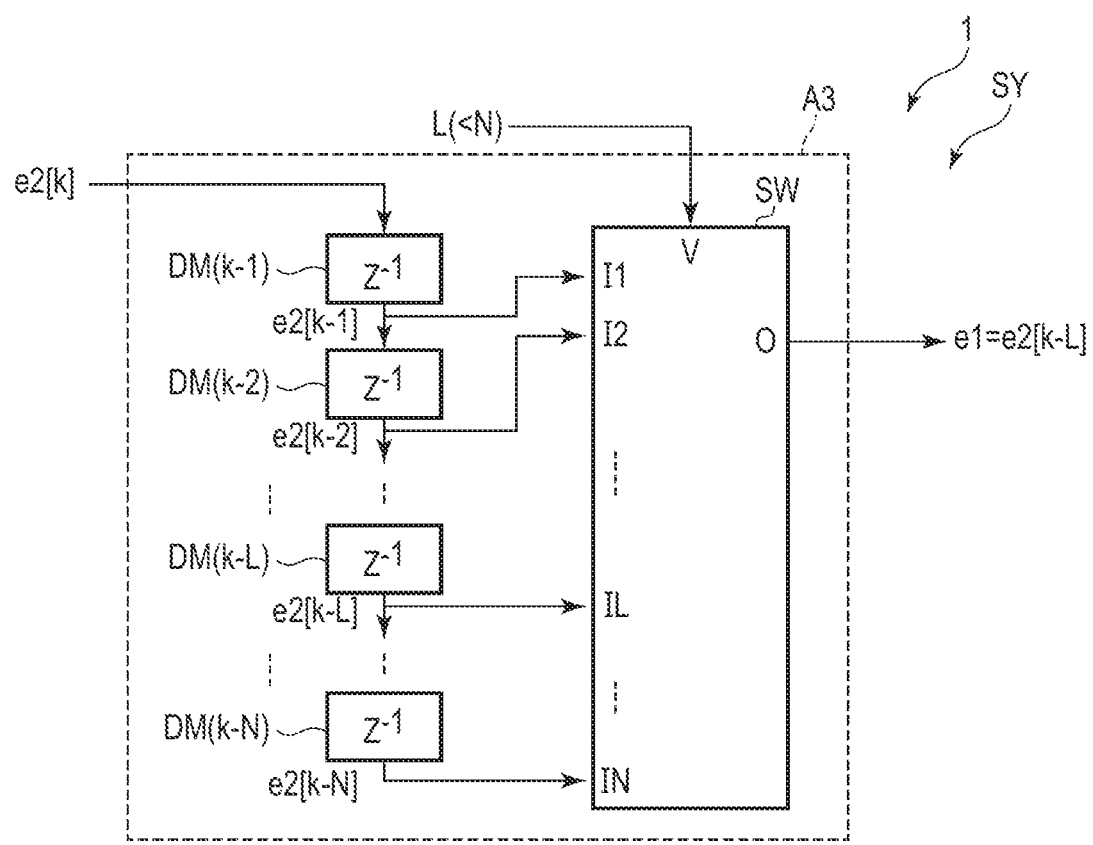
FIG. 4 is a block diagram illustrating an example of a variable delay memory unit of a repetitive control system illustrated in FIG. 3.

FIG. 4 is a block diagram illustrating an example of the variable delay memory unit A3 of the repetitive control system RC illustrated in FIG. 3. The variable delay memory unit A3 illustrated in FIG. 4 corresponds to the variable delay memory unit A3 illustrated in FIG. 3.

The variable delay memory unit A3 includes a plurality of delay memories DM(k−1), DM(k−2), DM(k−3), . . . , DM(k−L), . . . , DM(k−N), and a delay selector SW. Hereinafter, the plurality of delay memories DM(k−1) to DM(k−N) may be referred to as memory units. k corresponds to, for example, the total number of samples up to the present. L corresponds to the number of delay samples. N corresponds to an upper limit value of the number of samples that can be stored (or recorded) in the memory unit. N is, for example, larger than L (N>L).

The memory units DM(k−1) to DM(k−N) store (or record) sample values corresponding to the delay memory input signals. For example, each of the plurality of delay memories DM(k−1) to DM(k−N) stores (or records) a sample before the input signal by one sample. Each of the plurality of delay memories DM(k−1) to DM(k−N) is connected to the immediately previous delay memory. For example, the delay memories DM(k−1) and DM(k−2) are connected, the delay memories DM(k−2) and DM(k−3) are connected, . . . , the delay memories DM(k−L) and DM(k−(L+1)) are connected, and the delay memories DM(k−(N−1)) and DM(k−N) are connected. The memory units DM(k−1) to DM(k−N) are connected to the delay selector SW. The plurality of delay memories DM(k−1) to DM(k−N) is connected to the plurality of respective input terminals I1 to IN of the delay selector SW. For example, the memory units DM(k−1) to DM(k−N) set the upper limit value N of the number of samples that can be stored (or recorded). For example, the memory units DM(k−1) to DM(k−N) sequentially store sample values (hereinafter, may be referred to as a past sample value or a past memory value) $e2[k-1]$, $e2[k-2]$, . . . , and $e2(k-N)$ before (or in the past) the delay memory input signal $e2[k]$ of the k-th sample. For example, the delay memory DM(k−1) receives the delay memory input signal $e2[k]$ of the k-th sample and stores (or records) the delay memory input signal $e2(k)$ as a past sample value immediately before the k-th sample. At this time, the delay memory DM(k−2) receives the delay memory input signal $e2[k-1]$ of the (k−1)th sample from the delay memory DM(k−1) to store (or records) the past sample value $e2[k-1]$ of the (k−1)th sample as the past sample value $e2[k-2]$ of the (k−2)th sample. Similarly to the delay memories DM(k−1) and DM(k−2), the plurality of delay memories DM(k−3) to DM(k−N) each receives the immediately previous past sample from the immediately previous delay memory, and sequentially updates and stores (or records) the input past sample value is as a new past sample value.

The delay selector SW selects a particular past sample value from the past sample values $e2[k-1]$ to $e2[k-N]$ recorded in the memory units DM(k−1) to DM(k−N), respectively. The delay selector SW outputs the selected particular past sample value. For example, the delay selector SW selects the delay sample value $e2[k-L]$ corresponding to the past sample value corresponding to the number of delay samples L from the past sample values $e2[k-1]$ to $e2[k-N]$ recorded in the memory units DM(k−1) to DM(k−N), respectively, according to the number of delay samples L input to the terminal V. For example, the delay selector SW outputs a delay sample value (delay memory output signal) $e1=e2[k-L]$ via the output terminal O.

FIG. 5 is a block diagram illustrating an example of a positioning control system SY of the head 15 at the time of the access process according to the present embodiment. The positioning control system SY illustrated in FIG. 5 is substantially equivalent to the positioning control system SY illustrated in FIG. 3, but is different from the positioning control system illustrated in FIG. 3 in that a low pass filter A4 is provided. In FIG. 5, the same portions as those of the positioning control system SY illustrated in FIG. 3 are denoted by the same reference numerals, and a detailed description thereof will be omitted.

The repetitive control system RC includes the variable delay memory unit A3, the low pass filter A4, and the arithmetic unit CL2.

In FIG. 5, a delay memory input signal (hereinafter, may be referred to as a cutoff delay memory input signal) e3 obtained by cutting the signal (waveform or signal component) of the cutoff frequency fc according to the number of delay samples L from the delay memory input signal e2 by the low pass filter A4, and a delay memory output signal e1 corresponding to the internal state $z\hat{}(-L)\times e3$ delayed by the number of delay samples L are processed as signals (or information) by the positioning control system SY.

The repetitive control system RC stores (or records) the cutoff delay memory input signal e3 obtained by cutting the signal (waveform or signal component) of the cutoff frequency fc according to the number of delay samples L from the delay memory input signal e2 by the low pass filter A4 to acquire the delay memory output signal e1 based on the cutoff delay memory input signal e3. The repetitive control system RC outputs the acquired delay memory output signal e1. The arithmetic unit CL2 is connected to the arithmetic unit CL0 and the low pass filter A4. The variable delay memory unit A3 is connected to the low pass filter A4 and the arithmetic unit CL1. The low pass filter A4 is connected to the arithmetic unit CL2 and the variable delay memory unit A3.

In the positioning control system SY, the arithmetic unit CL2 receives the position error signal e0 and the delay memory output signal e1. The arithmetic unit CL2 calculates the delay memory input signal e2 obtained by adding the position error signal e1 and the delay memory output signal e1. The arithmetic unit CL2 outputs the delay memory input signal e2 to the low pass filter A4.

The low pass filter A4 receives the number of delay samples L and the delay memory input signal e2. The low pass filter A4 sets the cutoff frequency fc according to the number of delay samples L to generate the cutoff delay memory input signal e3 obtained by cutting the signal (waveform or signal component) of the cutoff frequency fc of the delay memory input signal e2. Note that the low pass filter A4 may set the cutoff frequency fc according to (the estimated value of) the fundamental frequency f1, and generate the cutoff delay memory input signal e3 obtained by cutting the signal (waveform or signal component) of the cutoff frequency fc of the delay memory input signal e2. The cutoff frequency fc of the low pass filter A4 may be set to a fixed value that does not depend on the number of delay samples L to be input. The low pass filter A4 outputs the cutoff delay memory input signal e3 to the variable delay memory unit A3. This makes it possible to prevent the repetitive control system RC from becoming unstable due to harmonics.

The variable delay memory unit A3 receives the number of delay samples L and the delay memory input signal e2. The variable delay memory unit A3 acquires the delay memory output signal e1 based on the number of delay samples L and the delay memory input signal e2. The variable delay memory unit A3 outputs the delay memory output signal e1 to the arithmetic unit CL1 and the arithmetic unit CL2.

FIG. 6 is a block diagram illustrating an example of a positioning control system SY of the head 15 at the time of the access process according to the present embodiment. The positioning control system SY illustrated in FIG. 6 is substantially equivalent to the positioning control system SY illustrated in FIG. 5, but is different from the positioning control system SY illustrated in FIG. 5 in that a phase compensator A5 is provided. In FIG. 6, the same portions as those of the positioning control system SY illustrated in FIG. 5 are denoted by the same reference numerals, and a detailed description thereof will be omitted.

The positioning control system SY includes the transducer A0, the control unit A1, the actuator A2, the repetitive control system RC, the phase compensator A5, and the arithmetic units CL0 and CL1. The repetitive control system RC includes the variable delay memory unit A3, the low pass filter A4, and the arithmetic unit CL2. The transducer A0, the control unit A1, the actuator A2, the repetitive control system RC, the phase compensator A5, the arithmetic unit CL0, and the arithmetic unit CL1 are included in, for example, the system controller 130, the driver IC 20, the head amplifier IC 30, the disk 10, the volatile memory 70, the non-volatile memory 80, and the buffer memory 90.

In FIG. 6, a cutoff delay memory input signal e4 obtained by cutting the signal (waveform or signal component) of the cutoff frequency fc from the delay memory input signal e2 by the low pass filter A4, a delay memory output signal e1 corresponding to an internal state $z\hat{}(-L) \times e4$ delayed by the number of delay samples L, and an output signal e5 (hereinafter, may be referred to as a phase compensation output signal) obtained by applying phase compensation on the delay memory output signal e1 are processed as signals (or information) by the positioning control system SY.

The repetitive control system RC stores the cutoff delay memory input signal e4 obtained by cutting the signal (waveform or signal component) of the cutoff frequency fc from the delay memory input signal e2 by the low pass filter A4 to acquire the delay memory output signal e1 based on the cutoff delay memory input signal e4. The repetitive control system RC outputs the acquired delay memory output signal e1. The arithmetic unit CL2 is connected to the arithmetic unit CL0 and the low pass filter A4. The variable delay memory unit A3 is connected to the low pass filter A4 and the phase compensator A5. The arithmetic unit CL1 is connected to the phase compensator A5, the arithmetic unit CL0, and the control unit A1.

The phase compensator A5 applies phase compensation. For example, the phase compensator A5 can compensate for the phase delay of the closed-loop characteristic of the positioning control system SY. The phase compensator A5 applies phase compensation by outputting a phase compensation output signal e5 corresponding to a past sample value recorded in the variable delay memory unit A3, for example, a sample value after (in the future) the delay memory output signal e1 by the number of d samples according to the number of delay samples L. The phase characteristic of the phase compensator A5 may be changed according to the phase characteristic of the low pass filter A4. The phase compensator A5 is connected to the variable delay memory unit A3 and the arithmetic unit CL1.

In the positioning control system SY, the arithmetic unit CL2 receives the position error signal e0 and the delay memory output signal e1. The arithmetic unit CL2 calculates the delay memory input signal e2 obtained by adding the position error signal e0 and the delay memory output signal e1. The arithmetic unit CL2 outputs the delay memory input signal e2 to the low pass filter A4.

The low pass filter A4 receives the delay memory input signal e2. The low pass filter A4 sets the cutoff frequency fc and generates a cutoff delay memory input signal e4 obtained by cutting the signal (waveform or signal component) of the cutoff frequency fc of the delay memory input signal e2. The low pass filter A4 outputs the cutoff delay memory input signal e4 to the variable delay memory unit A3.

The variable delay memory unit A3 receives the number of delay samples L and the cutoff delay memory input signal e4. The variable delay memory unit A3 acquires the delay memory output signal e1 based on the number of delay samples L and the cutoff delay memory input signal e4. The variable delay memory unit A3 outputs the delay memory output signal e1 to the arithmetic unit CL2 and the phase compensator A5.

The number of delay samples L and the delay memory output signal e1 are input to the phase compensator A5. The phase compensator A5 acquires the phase compensation output signal e5 based on the number of delay samples L and the delay memory output signal e1. The phase compensator A5 outputs the phase compensation output signal e5 to the arithmetic unit CL1.

The arithmetic unit CL1 receives the position error signal e0 and the phase compensation output signal e5. The arithmetic unit CL1 calculates a position error signal e obtained by adding the position error signal e0 and the phase compensation output signal e5. The arithmetic unit CL1 outputs the position error signal e to the control unit A1.

Figure 7:
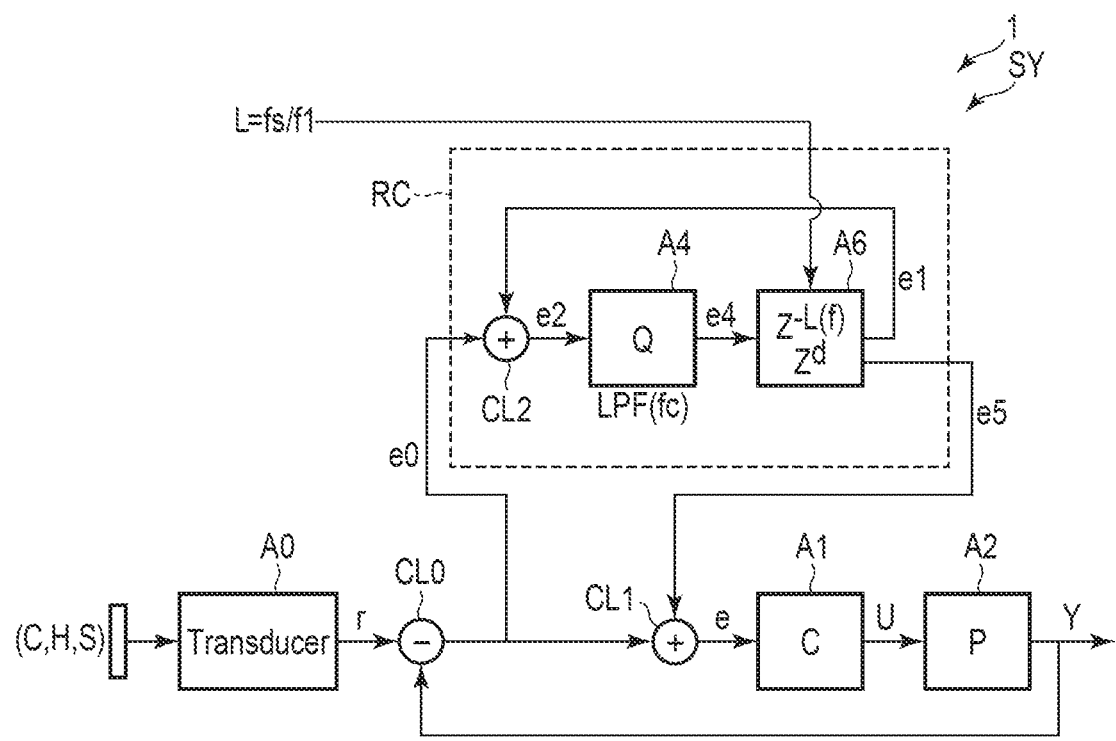
FIG. 7 is a block diagram illustrating an example of a head positioning control system during the access process according to the first embodiment.

FIG. 7 is a block diagram illustrating an example of a positioning control system SY of the head 15 at the time of the access process according to the present embodiment. The positioning control system SY illustrated in FIG. 7 corresponds to the positioning control system SY illustrated in FIG. 6. In FIG. 7, the same portions as those of the positioning control system SY illustrated in FIG. 6 are denoted by the same reference numerals, and a detailed description thereof will be omitted.

The positioning control system SY includes a transducer A0, a control unit A1, an actuator A2, a repetitive control system RC, and arithmetic units CL0 and CL1. The repetitive control system RC includes a variable delay memory unit A6, the low pass filter A4, and the arithmetic unit CL2. The transducer A0, the control unit A1, the actuator A2, the repetitive control system RC, the arithmetic unit CL0, and the arithmetic unit CL1 are included in, for example, the system controller 130, the driver IC 20, the head amplifier IC 30, the disk 10, the volatile memory 70, the non-volatile memory 80, and the buffer memory 90.

The arithmetic unit CL2 is connected to the arithmetic unit CL0, the low pass filter A4, and the variable delay memory unit A6. The low pass filter A4 is connected to the arithmetic unit CL2 and the variable delay memory unit A6.

The variable delay memory unit A6 corresponds to a memory unit in which the functions of the variable delay memory unit A3 and the phase compensator A5 are integrated. The low pass filter A4 is connected to the arithmetic unit CL2 and the variable delay memory unit A6. The variable delay memory unit A6 is connected to the low pass filter A4, the arithmetic unit CL1, and the arithmetic unit CL2.

The low pass filter A4 outputs the cutoff delay memory input signal e4 to the variable delay memory unit A6.

The variable delay memory unit A6 receives the number of delay samples L and the cutoff delay memory input signal e4. The variable delay memory unit A6 acquires the delay memory output signal e1 and the phase compensation output signal e5 based on the number of delay samples L and the cutoff delay memory input signal e4. The variable delay memory unit A6 outputs the delay memory output signal e1 to the arithmetic unit CL2 to output the phase compensation output signal e5 to the arithmetic unit CL1.

FIG. 8 is a block diagram illustrating an example of the variable delay memory unit A6 of the repetitive control system RC illustrated in FIG. 7. The variable delay memory unit A6 illustrated in FIG. 8 corresponds to the variable delay memory unit A6 illustrated in FIG. 7.

The variable delay memory unit A6 includes the memory units DM(k−1), DM(k−2), DM(k−3), . . . , DM(k−L+d), . . . , DM(k−L), . . . , DM(k−N), and the delay selector SW.

For example, the memory units DM(k−1) to DM(k−N) sequentially store past sample values (hereinafter, may be referred to as a cutoff past sample value or a cutoff past memory value) $e4[k-1]$, $e4[k-2]$, . . . , $e4[k-L+d]$, . . . , $e4[k-L]$, . . . , and $e2[k-N]$ before (or in the past) the cutoff delay memory input signal $e4[k]$ of the k-th sample. For example, the delay memory DM(k−1) receives the cutoff delay memory input signal $e4[k]$ of the k-th sample, and stores (or records) the cutoff delay memory input signal $e4[k]$ as the cutoff past sample value immediately before the k-th sample. At this time, the delay memory DM(k−1) receives the cutoff delay memory input signal $e4[k-2]$ of the (k−1)th sample from the delay memory DM(k−1), and stores (or records) the cutoff past sample value $e2[k-1]$ of the (k−1)th sample as the cutoff past sample value $e2[k-2]$ of the (k−2)th sample. Similarly to the delay memories DM(k−1) and DM(k−2), the plurality of delay memories DM(k−3) to DM(k−N) each receives the immediately previous cutoff past sample value from the immediately previous delay memory, and sequentially updates and stores (or records) the input cutoff past sample value as a new cutoff past sample value.

The delay selector SW selects a particular cutoff past sample value from the cutoff past sample values $e4[k-1]$ to $e2[k-N]$ recorded in the memory units DM(k−1) to DM(k−N), respectively. The delay selector SW outputs the selected particular cutoff past sample value. For example, the delay selector SW selects the delay memory output signal $e1=e4[k-L]$ corresponding to the cutoff past sample value corresponding to the number of delay samples L from the cutoff past sample values $e2[k-1]$ to $e2[k-N]$ recorded in the memory units DM(k−1) to DM(k−N), respectively, according to the number of delay samples L input to the terminal V. For example, the delay selector SW acquires a phase compensation output signal $e5=e4[k-L+d]$ corresponding to a sample value after (in the future) the selected delay memory output signal e1 by the number of d samples according to the number of delay samples L. For example, the delay selector SW outputs the cutoff delay sample value (delay memory output signal) $e1=e4[k-L]$ via the output terminal O, and simultaneously outputs the cutoff delay sample value (phase compensation output signal) $e5=e4[k-L+d]$ via the output terminal Q.

Figure 9:
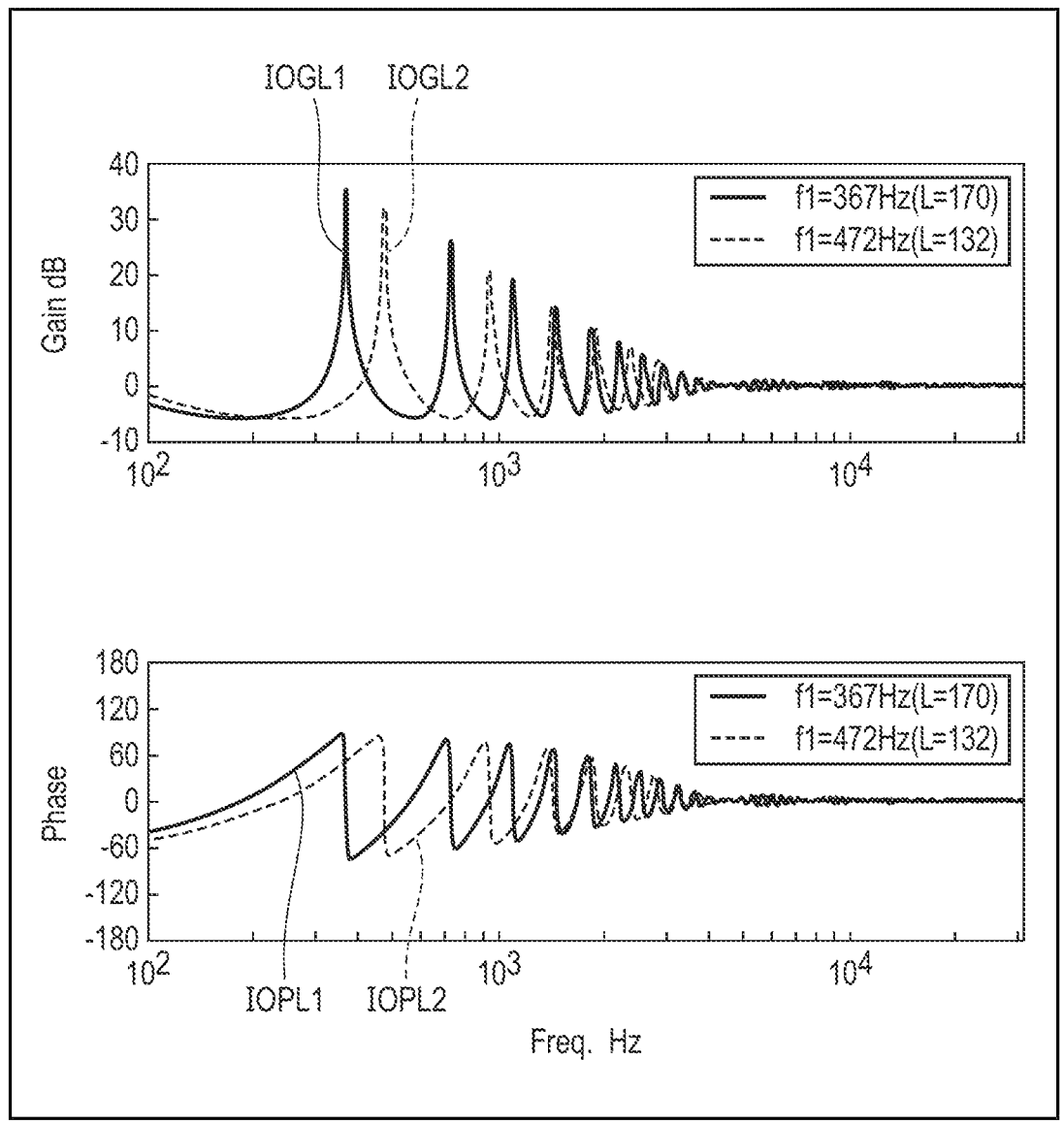
FIG. 9 is a diagram illustrating an example of input/output characteristics of the repetitive control system corresponding to FIG. 6.

FIG. 9 is a diagram illustrating an example of the input/output characteristic e5/e0 of the repetitive control system BC corresponding to FIG. 6. In FIG. 9, the servo sample frequency fs is 62.4 kHz. In the upper diagram of FIG. 9, the horizontal axis represents the frequency (Hz) and the vertical axis represents the gain (dB). The upper diagram in FIG. 9 illustrates a change IOGL1 in the gain with respect to the frequency of the input/output characteristic e5/e0 of the repetitive control system RC in a case where (the estimated value of) the fundamental frequency f1 corresponding to the harmonic disturbance generated by the rotation of the FAN is 367 Hz (the number of delay samples L=170), and a change IOGL2 in the gain with respect to the frequency of the input/output characteristic e5/e0 of the repetitive control system RC in a case where (the estimated value of) the fundamental frequency f1 corresponding to the harmonic disturbance generated by the rotation of the FAN is 472 Hz (the number of delay samples L=132). In the upper diagram of FIG. 9, the gain change IOGL1 is indicated by a solid line, and the gain change IOGL2 is indicated by a broken line. In the lower diagram of FIG. 9, the horizontal axis represents the frequency (Hz) and the vertical axis represents the phase. The lower diagram in FIG. 9 illustrates a phase change IOPL1 of the input/output characteristic e5/e0 of the repetitive control system RC with respect to the frequency in a case where (the estimated value of) the fundamental frequency f1 corresponding to the harmonic disturbance generated due to the rotation of the FAN is 367 Hz (the number of delay samples L=170), and a phase change IOPL2 of the input/output characteristic e5/e0 of the repetitive control system RC with respect to the frequency in a case where (the estimated value of) the fundamental frequency f1 corresponding to the harmonic disturbance generated due to the rotation of the FAN is 472 Hz (the number of delay samples L=132). In the lower diagram of FIG. 9, the phase change IOPL1 is indicated by a solid line, and the phase change IOPL2 is indicated by a broken line.

In the example illustrated in FIG. 9, when the servo sample frequency fs=62.4 kHz and the estimated value of the fundamental frequency f1=367 Hz, the number of delay samples L=62400/367=170, and thus the repetitive control system RC operates with the number of delay samples 170. As indicated by IOGL1 and IOPL1 with the solid line (f1=367 Hz) in FIG. 9, the repetitive control system RC also extracts the multiplied frequency that is the harmonic of the estimated value f1=367 Hz of the fundamental frequency.

In the example illustrated in FIG. 9, when the servo sample frequency fs=62.4 kHz and the estimated value of the fundamental frequency f1=472 Hz, the number of delay samples L=62400/472=132, and thus the repetitive control system RC operates with the number of delay samples 132. As indicated by IOGL2 and IOPL2 with broken lines (f1=472 Hz) in FIG. 9, the repetitive control system RC also extracts the multiplied frequency that is the harmonic of the estimated value f1=472 Hz of the fundamental frequency.

As described above, it can be seen that the input/output characteristic of the repetitive control system RC corresponds to the harmonic filter of the estimated value f1 of the fundamental frequency.

Figure 10:
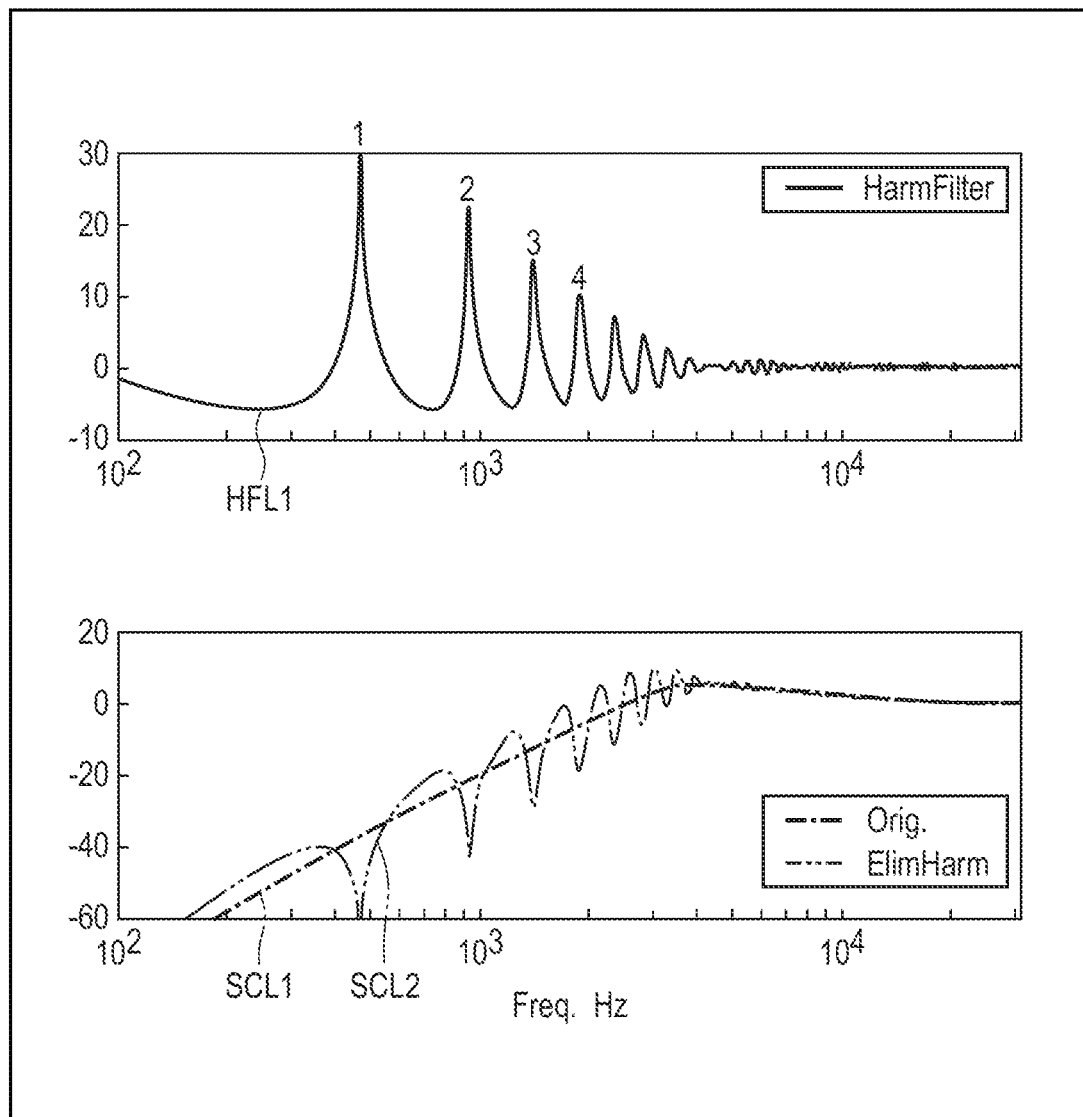
FIG. 10 is a diagram illustrating an example of a filter of harmonics of an estimated value of the fundamental frequency of the harmonic disturbance and a change in a sensitivity characteristic of the positioning control system.

FIG. 10 is a diagram illustrating an example of the filter HFL1 of harmonics of the estimated value f1 of the fundamental frequency of the harmonic disturbance and a change in a sensitivity characteristic of the positioning control system SY. The upper diagram of FIG. 10 corresponds to the upper diagram of FIG. 9. In the upper diagram of FIG. 10, the horizontal axis represents the frequency (Hz) and the vertical axis represents the gain (dB). The upper diagram in FIG. 10 illustrates a gain change (hereinafter, may be referred to as a harmonic filter) HFL1 of the input/output characteristic e5/e0 of the repetitive control system RC corresponding to the filter of the harmonic of (the estimated value of) the fundamental frequency f1=472 Hz corresponding to the harmonic disturbance with respect to the frequency. The harmonic filter HFL1 corresponds to, for example, the gain change IOGL2. In the lower diagram of FIG. 10, the horizontal axis represents the frequency (Hz), and the vertical axis represents the sensitivity characteristic (hereinafter, may be simply referred to as a sensitivity characteristic) of the positioning control system SY. The lower diagram of FIG. 10 illustrates a change SCL1 in the sensitivity characteristic with respect to the frequency in a case where the repetitive control system RC of the present embodiment, for example, the repetitive control system RC illustrated in FIG. 6 is not applied, and a change SCL2 in the sensitivity characteristic with respect to the frequency in a case where the repetitive control system RC of the present embodiment, for example, the repetitive control system RC illustrated in FIG. 6 is applied with the fundamental frequency f1=472 Hz corresponding to the harmonic disturbance caused by the rotation of the FAN. In the lower diagram of FIG. 10, the change SCL1 in the sensitivity characteristic is indicated by a one-dot chain line, and the change SCL2 in the sensitivity characteristic is indicated by a two-dot chain line.

In the example illustrated in FIG. 10, in the positioning control system SY, the suppression sensitivity is improved at the multiplied frequencies of (the estimated value of) the fundamental frequency f1=472 Hz.

Figure 11:
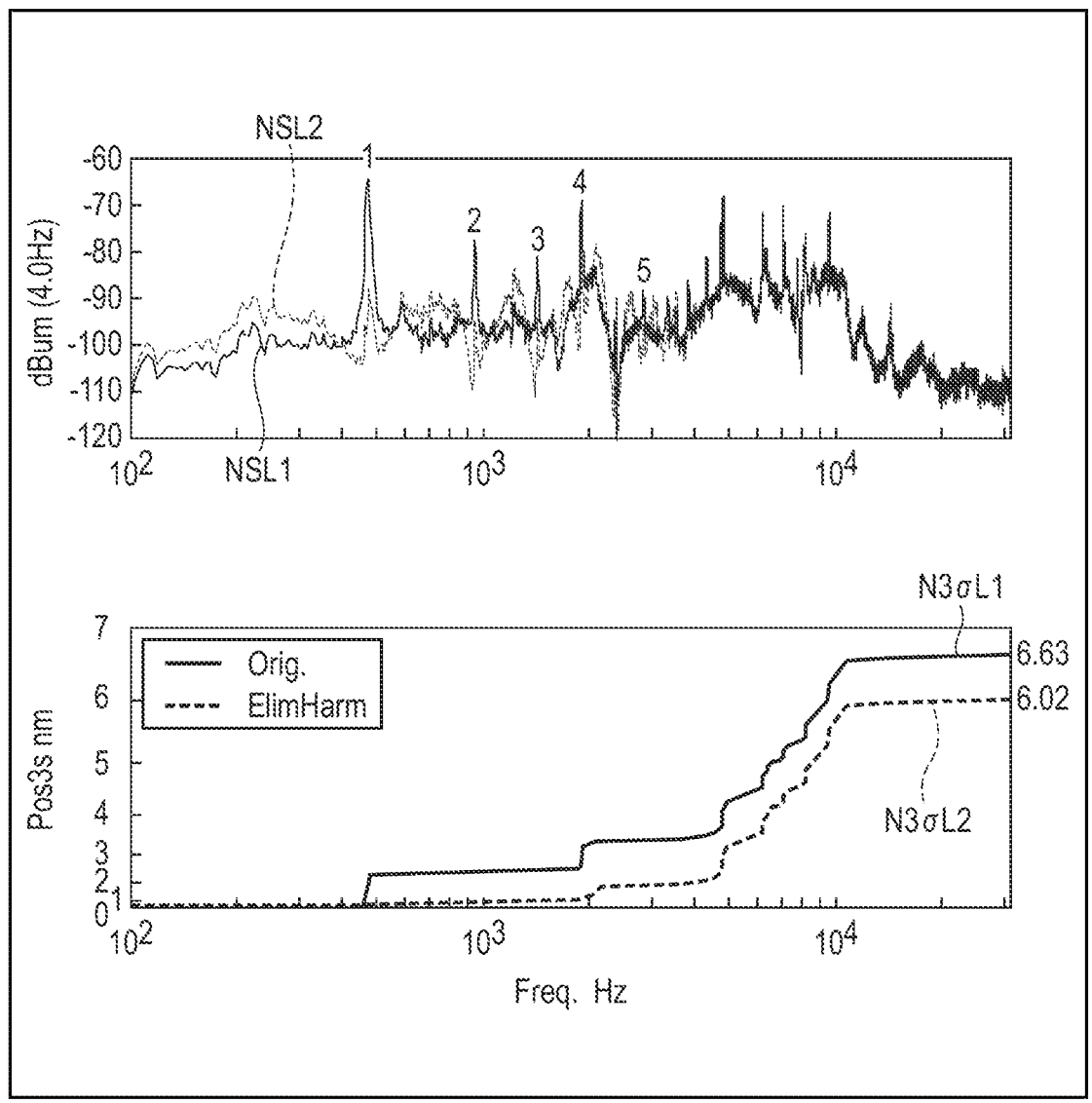
FIG. 11 is a diagram illustrating an example of spectra of a PES and a cumulative square sum of the spectra of the PES in an environment having a harmonic disturbance.

FIG. 11 is a diagram illustrating an example of spectra of a PES and a cumulative square sum of the spectrum of the PES in an environment having a harmonic disturbance. FIG. 11 corresponds to FIG. 10, for example. In the upper diagram of FIG. 11, the horizontal axis represents the frequency (Hz), and the vertical axis represents the PES (dBum (4.0 Hz)) of the rotation asynchronous component (Non-Repeatable Positioning Error (NRPE)) in the environment having the harmonic disturbance. The upper diagram in FIG. 11 illustrates a change NSL1 in the PES of the rotation asynchronous component with respect to the frequency in the environment with the harmonic disturbance in a case where the repetitive control system RC of the present embodiment, for example, the repetitive control system RC illustrated in FIG. 6, is not applied, and a change NSL2 in the PES of the rotation asynchronous component with respect to the frequency in the environment with the harmonic disturbance in a case where the repetitive control system RC of the present embodiment, for example, the repetitive control system PC illustrated in FIG. 6, is applied with the fundamental frequency f1 422 Hz corresponding to the harmonic disturbance generated due to the rotation of the FAN. In the upper diagram of FIG. 11, the change NSL1 in the PES of the rotation asynchronous component in the environment having the harmonic disturbance is indicated by a solid line, and the change NSL2 in the PES of the rotation asynchronous component in the environment having the harmonic disturbance is indicated by a broken line. In the lower diagram of FIG. 11, the horizontal axis represents the frequency (Hz), and the vertical axis represents the cumulative 3σ (three times the standard deviation) value (ran) of the rotation asynchronous component in the environment having the harmonic disturbance. The lower diagram of FIG. 11 illustrates a change N3σL1 in the cumulative 3σ value of the rotation asynchronous component with respect to the frequency in the environment with the harmonic disturbance in a case where the repetitive control system RC of the present embodiment, for example, the repetitive control system RC illustrated in FIG. 6, is not applied, and a change N3σL2 in the cumulative 3σ value of the rotation asynchronous component with respect to the frequency in the environment with the harmonic disturbance in a case where the repetitive control system RC of the present embodiment, for example, the repetitive control system RC illustrated in FIG. 6, is applied with the fundamental frequency f1=472 corresponding to the harmonic disturbance caused by the rotation of the FAN. In the lower diagram of FIG. 11, the change N3σL1 in the cumulative 3σ value of the rotation asynchronous component with respect to the frequency in the environment having the harmonic disturbance is indicated by a solid line, and the change N3σL2 in the cumulative 3σ value of the rotation asynchronous component with respect to the frequency in the environment having the harmonic disturbance is indicated by a broken line.

As indicated by the change NSL1 in the PES of the rotation asynchronous component in FIG. 11, when the repetitive control system RC of the present embodiment is not applied, the harmonic disturbance is applied to the base or the like in the environment having the harmonic disturbance, so that the PES deteriorates at the multiplied frequencies of the estimated value f1=472 Hz of the fundamental frequency corresponding to the harmonic disturbance. Therefore, as indicated by the change N3σL1 in the cumulative 3σ value of the rotation asynchronous component in FIG. 11, when the repetitive control system RC of the present embodiment is applied in an environment having a harmonic disturbance, the cumulative 3σ value is 6.63 nm.

As indicated by the change NSL2 in the PES of the rotation asynchronous component in FIG. 11, when the repetitive control system RC of the present embodiment is applied in an environment having a harmonic disturbance, the PES is suppressed (suppressed or compensated) at 1st, 2nd, 3rd, 4th, and 5th order multiplied frequencies of the estimated value f1=472 Hz of the fundamental frequency of the disturbance. Therefore, as indicated by the change N3σL2 in the cumulative 3σ value of the rotation asynchronous component in FIG. 11, when the repetitive control system RC of the present embodiment is applied in an environment having a harmonic disturbance, the 3σ value is 6.02 nm. That is, in an environment having a harmonic disturbance, the cumulative 3σ value when the repetitive control system RC of the present embodiment is applied is greatly improved as compared with the cumulative 3σ value when the repetitive control system RC of the present embodiment is not applied.

Figure 12:
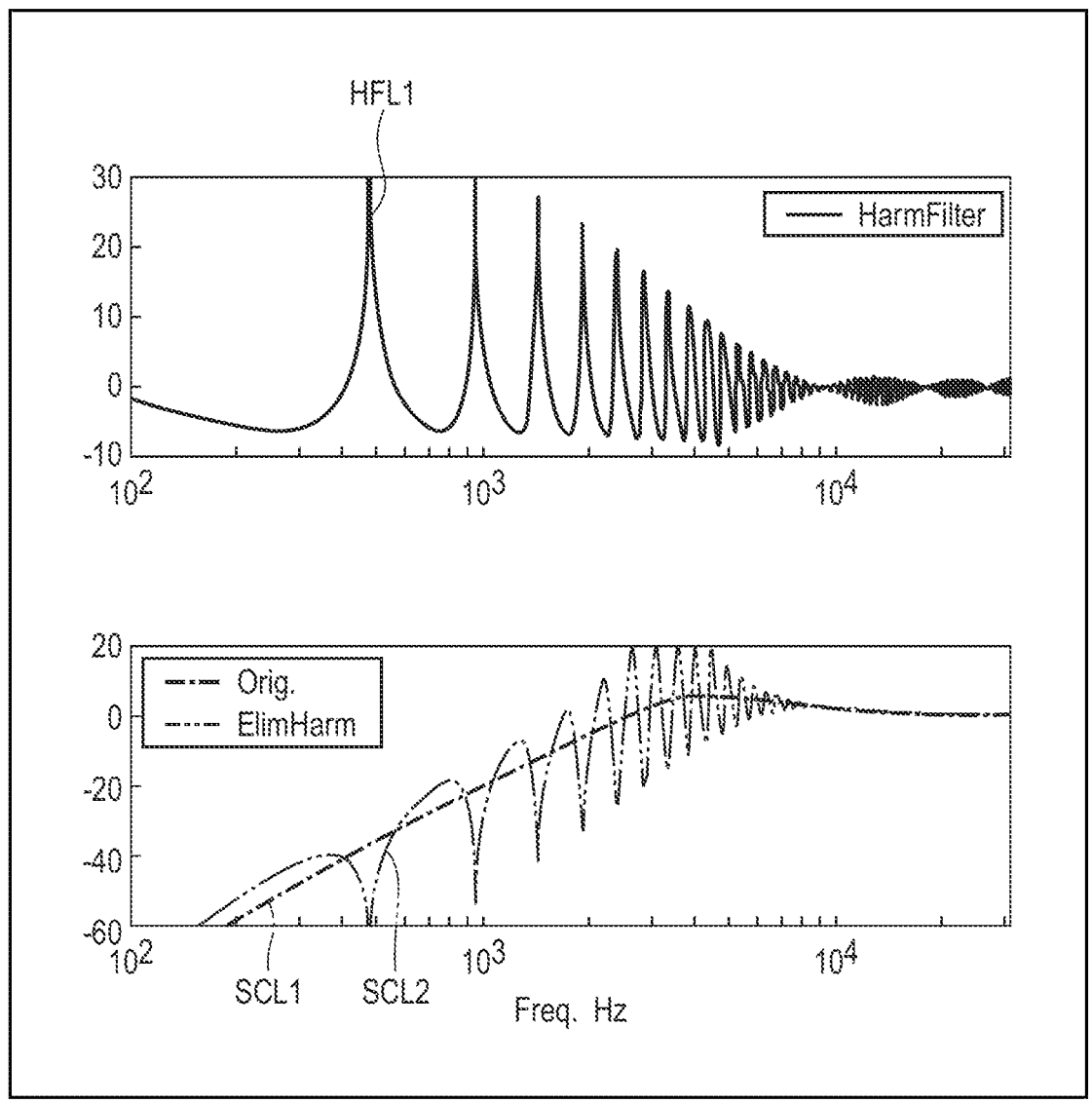
FIG. 12 is a diagram illustrating an example of the harmonic filter illustrated in FIG. 8 and a change in sensitivity characteristics of the positioning control system when the low pass filter is not applied.

FIG. 12 is a diagram illustrating an example of a harmonic filter HFL1 and a change in sensitivity characteristics of the positioning control system SY illustrated in FIG. 10 when the low pass filter A4 is not applied. FIG. 12 corresponds to FIG. 10. In the upper diagram of FIG. 12, the horizontal axis represents the frequency (Hz) and the vertical axis represents the gain (dB). The upper diagram of FIG. 12 illustrates the harmonic filter HFL1 illustrated in FIG. 10 to which the low pass filter A4 is not applied. In the lower diagram of FIG. 12, the horizontal axis represents the frequency (Hz), and the vertical axis represents the sensitivity characteristic of the positioning control system SY. The lower diagram of FIG. 12 illustrates a change SCL1 in the sensitivity characteristics with respect to the frequency illustrated in FIG. 10 to which the low pass filter A4 and the repetitive control system RC illustrated in FIG. 6 are not applied and a change SCL2 in the sensitivity characteristics with respect to the frequency illustrated in FIG. 10 to which the low pass filter A4 is not applied and the repetitive control system RC illustrated in FIG. 6 is applied. In the lower diagram of FIG. 12, the change SCL1 in the sensitivity characteristic is indicated by a one-dot chain line, and the change SCL2 in the sensitivity characteristic is indicated by a two-dot chain line.

The change SCL2 in the sensitivity characteristic illustrated in FIG. 12 greatly fluctuates as compared with the change SCL2 in the sensitivity characteristic illustrated in FIG. 10. The change SCL2 in the sensitivity characteristic illustrated in FIG. 12 has characteristics in which the disturbance is greatly amplified particularly in the frequency band of 2 kHz to 5 kHz as compared with the change SCL2 in the sensitivity characteristic illustrated in FIG. 10.

Figure 13:
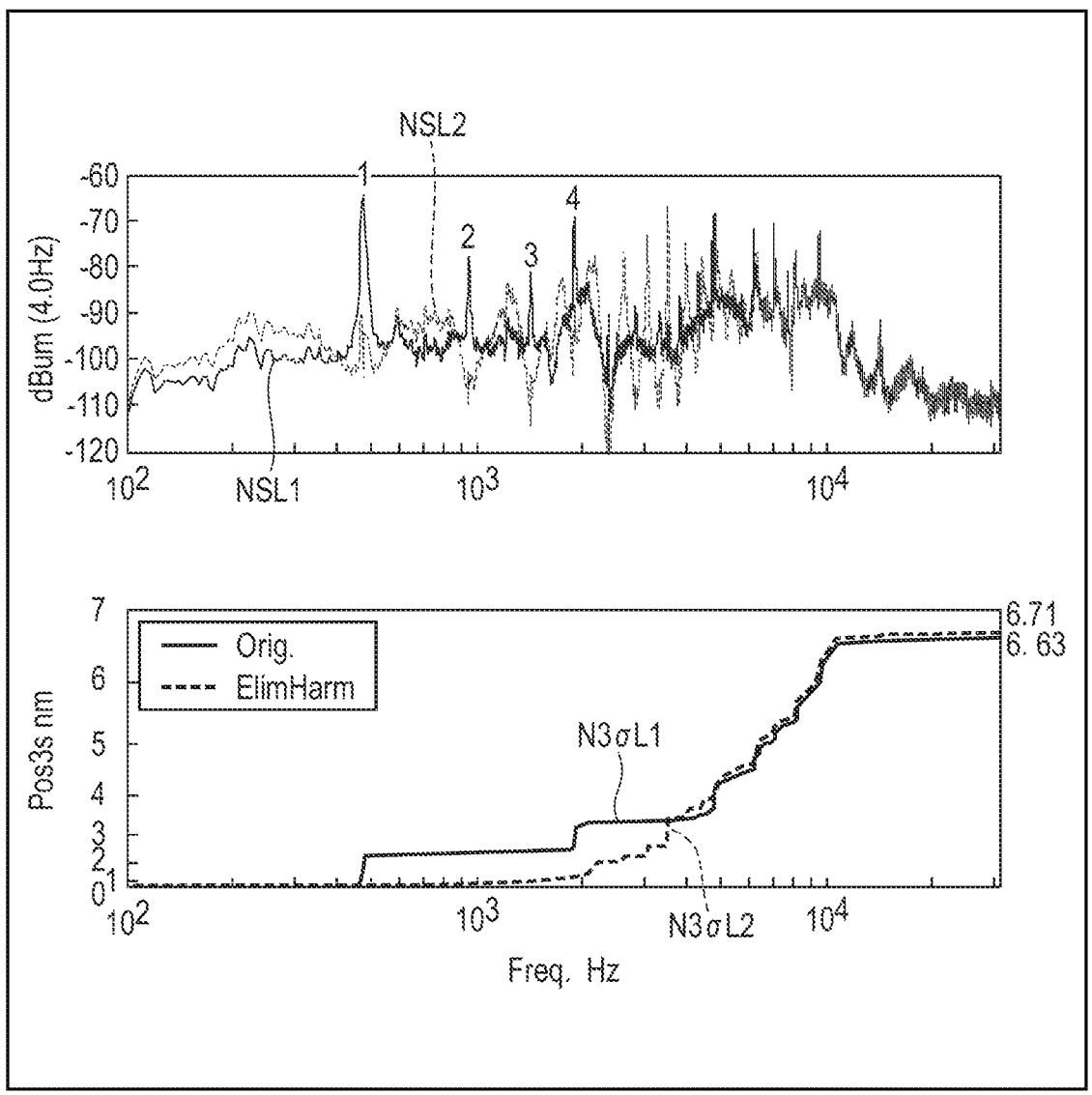
FIG. 13 is a diagram illustrating an example of spectra of a PES and a cumulative square sum of the spectra of the PES in an environment having a disturbance of harmonics to which a low pass filter is not applied.

FIG. 13 is a diagram illustrating an example of spectra of a PES and a cumulative square sum of the spectra of the PES in an environment having disturbance of harmonics to which the low pass filter A4 is not applied. FIG. 13 corresponds to FIG. 12, for example. In the upper diagram of FIG. 13, the horizontal axis represents the frequency (Hz), and the vertical axis represents the PES (dBum (4.0 Hz)) of the rotation asynchronous component in the environment having the harmonic disturbance. The upper diagram of FIG. 13 illustrates a change NSL1 in the PES of the rotation asynchronous component with respect to the frequency illustrated in FIG. 11 to which the repetitive control system RC illustrated in FIG. 6 is not applied and a change NSL2 in the PES of the rotation asynchronous component with respect to the frequency illustrated in FIG. 11 to which the low pass filter A4 is not applied and the repetitive control system RC illustrated in FIG. 6 is applied. In the upper diagram of FIG. 13, the change NSL1 in the PES of the rotation asynchronous component in the environment having the harmonic disturbance is indicated by a solid line, and the change NSL2 in the PES of the rotation asynchronous component in the environment having the harmonic disturbance is indicated by a broken line. In the lower diagram of FIG. 13, the horizontal axis represents the frequency (Hz), and the vertical axis represents the cumulative 13 value (nm) of the rotation asynchronous component in the environment having the harmonic disturbance. The lower diagram of FIG. 13 illustrates a change N3σL1 of the cumulative 3σ value of the rotation asynchronous component with respect to the frequency illustrated in FIG. 11 in a case where the repetitive control system RC illustrated in FIG. 6 is not applied, and a change N3σL2 of the cumulative 3σ value of the rotation asynchronous component with respect to the frequency illustrated in FIG. 11 in a case where the low pass filter A4 is not applied and the repetitive control system RC illustrated in FIG. 6 is applied. In the lower diagram of FIG. 13, the change N3σL1 in the cumulative 3σ value of the rotation asynchronous component with respect to the frequency in the environment having the harmonic disturbance is indicated by a solid line, and the change N3σL2 in the cumulative 3σ value of the rotation asynchronous component with respect to the frequency in the environment having the harmonic disturbance is indicated by a broken line.

As indicated by the change NSL2 in the PES of the rotation asynchronous component with respect to the frequency in FIG. 13, in an environment having a harmonic disturbance, when the low pass filter A4 and the repetitive control system RC of the present embodiment are not applied, the PES is suppressed (suppressed or compensated) at 1st, 2nd, 3rd, and 4th order multiplied frequencies of the estimated value f1=472 Hz of the fundamental frequency of the disturbance. However, at frequencies after the 5th order multiplied frequency of the estimated value 472 Hz of the fundamental frequency of the disturbance, the PES deterioration between the multiplied frequencies exceeds the PES suppression (suppression or compensation) at the multiplied frequencies.

Therefore, as indicated by the change N3σL2 in the cumulative 3σ value of the rotation asynchronous component in FIG. 11, when the low pass filter A4 is not applied and the repetitive control system RC of the present embodiment is applied in an environment having a harmonic disturbance, the 3σ value is 6.71 nm. That is, in an environment having a harmonic disturbance, the cumulative 3σ value in a case where the low pass filter A4 is not applied and the repetitive control system RC of the present embodiment is applied is substantially the same as or slightly deteriorates as compared with the cumulative 3σ value in a case where the low pass filter A4 and the repetitive control system RC of the present embodiment are not applied.

Figure 14:
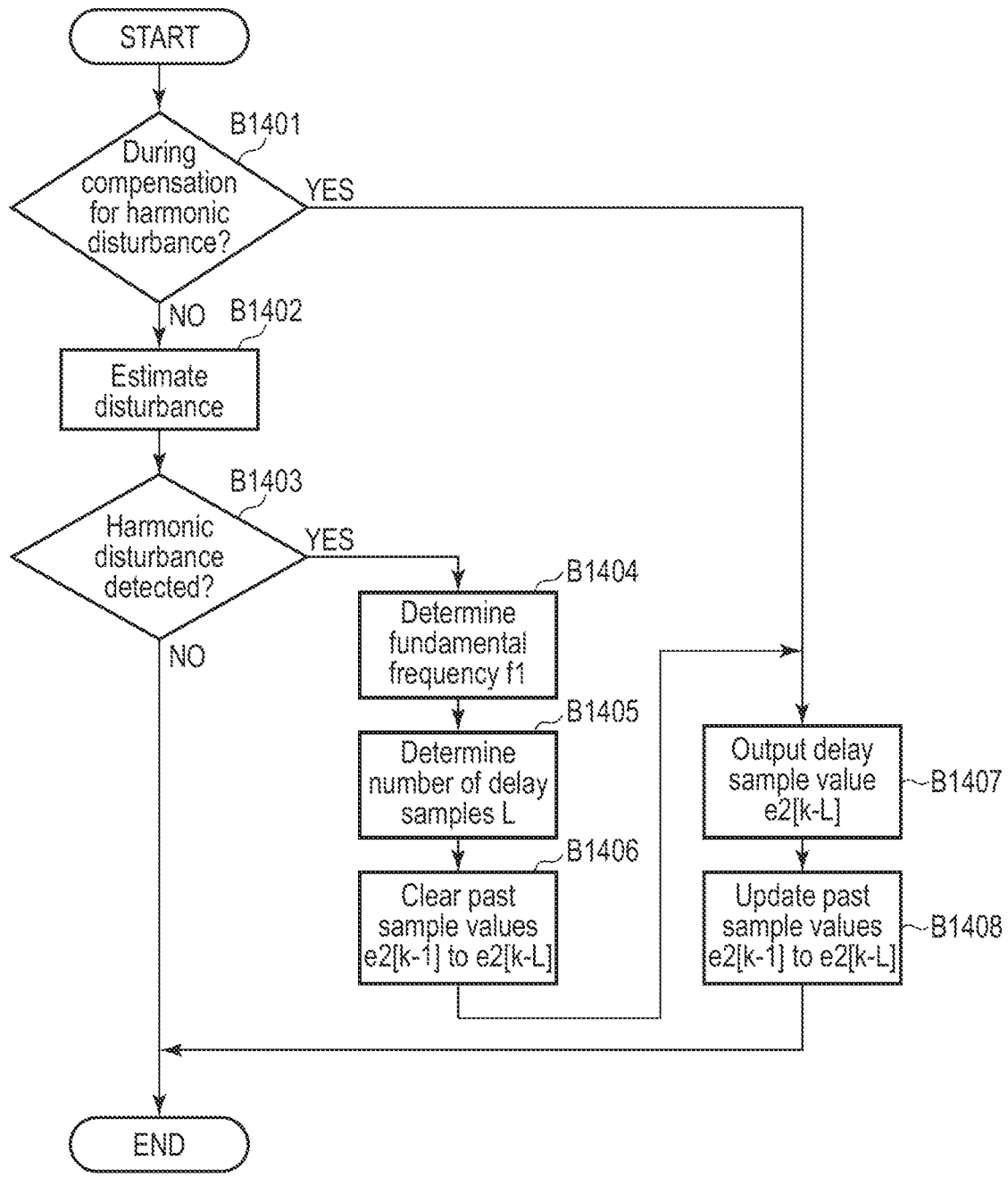
FIG. 14 is a flowchart illustrating an example of a method of compensating for a harmonic corresponding to a harmonic disturbance according to the first embodiment.

FIG. 14 is a flowchart illustrating an example of a method of compensating for a harmonic corresponding to a harmonic disturbance according to the present embodiment.

The MPU 60 determines whether a harmonic disturbance is being compensated for (B1401). When determining that the harmonic disturbance is not being compensated for (NO in B1401), the MPU 60 estimates (the fundamental frequency corresponding to) the harmonic disturbance (B1402), and determines whether the harmonic disturbance is detected or not (B1403). When determining that the harmonic disturbance is not detected (NO in B1403), the MPU 60 ends the process.

When determining that the harmonic disturbance is detected (YES in B1403), the MPU 60 determines the fundamental frequency f1 corresponding to the harmonic disturbance (B1404), and determines the number of delay samples L based on the determined fundamental frequency f1 (B1405). The MPU 60 clears the past sample values e2[k−1] to e2[k−L] stored in the delay memories DM(k−1) to DM(k−N), for example, to zero, and advances the process to B1407.

When it is determined that the number of delay samples L has already been determined and the harmonic disturbance is being compensated for (YES in B1401), the MPU 60 outputs the delay sample value e2[k−L] from the repetitive control unit RC (B1407). The MPU 60 sequentially updates the past sample values e2[k−1] to e2[k−L], updates the delay memory input signal e2[k] based on the new position error signal e0[k] and the current delay memory output signal e2[k−L] (B1408), and ends the process.

Figure 15:
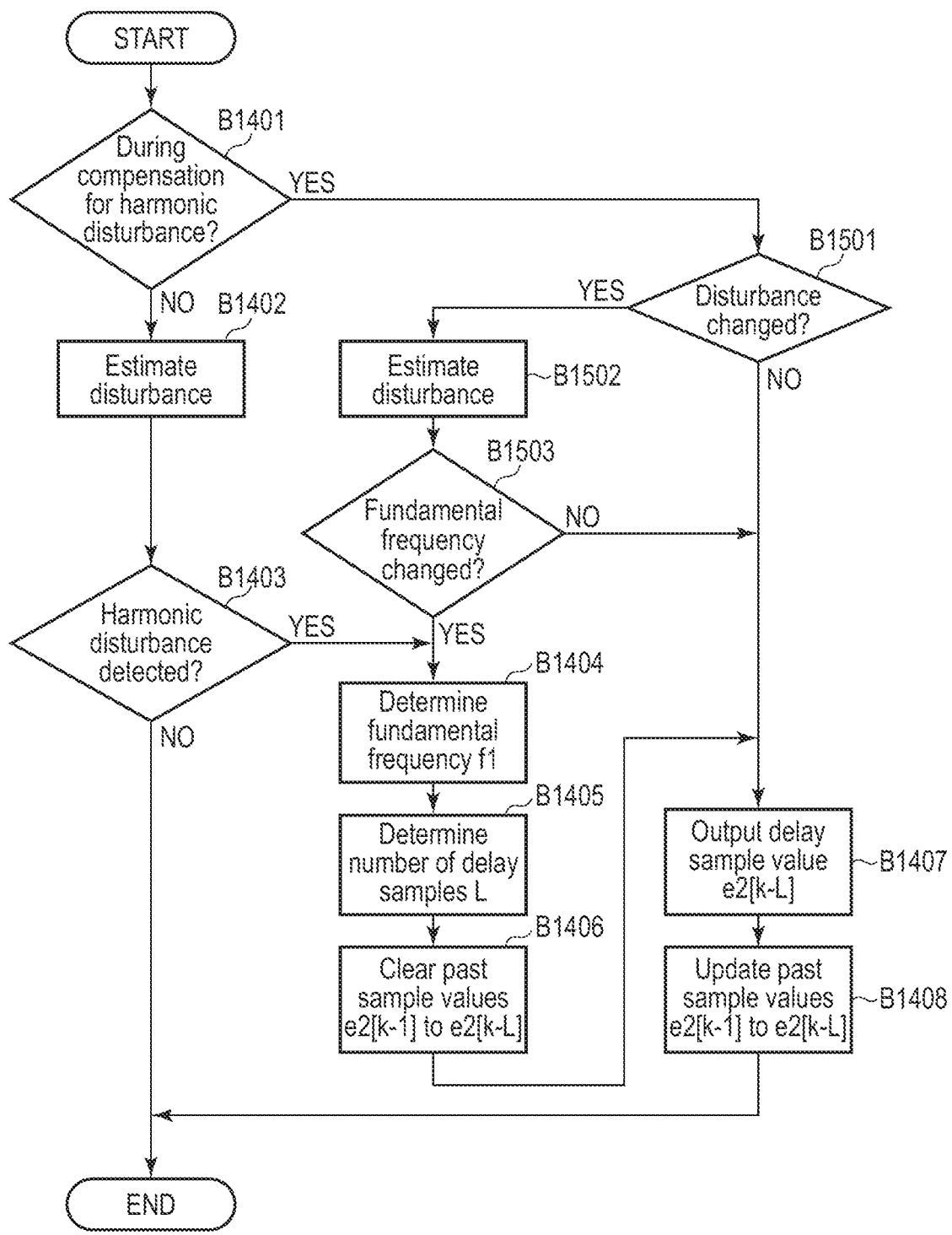
FIG. 15 is a flowchart illustrating an example of a method of compensating for a harmonic corresponding to a disturbance according to the first embodiment.

FIG. 15 is a flowchart illustrating an example of a method of compensating for a harmonic corresponding to a disturbance according to the present embodiment.

When determining that the harmonic disturbance is being compensated for by determining the number of delay samples L (YES in B1401), the MPU 60 determines whether the harmonic disturbance during compensation is changed (B1501). When it is determined that the harmonic disturbance during compensation has not changed (NO in B1501), the MPU 60 advances the process to B1407.

When determining that the harmonic disturbance during compensation has changed (YES in B1501), the MPU 60 re-estimates (the fundamental frequency corresponding to) the harmonic disturbance (B1502), and determines whether the fundamental frequency f1 corresponding to the harmonic disturbance re-estimated has changed (B1503). For example, when the increase in the 3σ value of the PES corresponding to the harmonic disturbance is confirmed, the MPU 60 determines that (the frequency of) the harmonic disturbance to be compensated for has changed. When determining that the harmonic disturbance during compensation has changed, the MPU 60 re-estimates the fundamental frequency corresponding to the changed harmonic disturbance, and compares the re-estimated fundamental frequency corresponding to the harmonic disturbance with the fundamental frequency corresponding to the harmonic disturbance currently being compensated for to determine whether the fundamental frequency f1 has changed.

When determining that the fundamental frequency f1 has not changed (NO in B1503), the MPU 60 advances the process to B1407. When determining that the fundamental frequency f1 has changed (YES in B1503), the MPU 60 advances the process to B1404.

According to the present embodiment, when it is determined that the number of delay samples L has already been determined and the harmonic disturbance is being compensated for, the magnetic disk device 1 outputs the delay sample value e2[$k$–L] from the repetitive control unit PC, sequentially updates the past sample values e2[$k$–1] to e2[$k$–L], and updates the delay memory input signal e2[$k$] based on the new position error signal e0[$k$] and the current delay memory output signal e2[$k$–L]. In addition, when determining that the harmonic disturbance is not being compensated for, the magnetic disk device 1 estimates the fundamental frequency f1 corresponding to the harmonic disturbance and detects the harmonic disturbance. When the harmonic disturbance is detected, the magnetic disk device 1 determines the fundamental frequency f1 of the harmonic disturbance, determines the number of delay samples L based on the fundamental frequency f1, and clears the past sample values e2[$k$–1] to e2[$k$–L] stored in the delay memories DM(k–1) to DM(k–N), respectively, to zero, for example.

Further, when determining that the number of delay samples L has already been determined and the harmonic disturbance is being compensated for, the magnetic disk device 1 determines whether the harmonic disturbance during compensation has changed. For example, when an increase in the 3σ value of the PES corresponding to the harmonic disturbance during compensation is confirmed, the magnetic disk device 1 determines that the frequency of the harmonic disturbance to be compensated for has changed. When determining that the harmonic disturbance has changed, the magnetic disk device 1 re-estimates the fundamental frequency corresponding to the changed harmonic disturbance. When determining that the re-estimated fundamental frequency has changed with respect to the fundamental frequency corresponding to the harmonic disturbance currently being compensated for, the magnetic disk device 1 re-determines a new fundamental frequency f1, and re-determines a new delay sample based on the re-determined new fundamental frequency f1.

Therefore, the magnetic disk device 1 can prevent deterioration of the PES due to the harmonic disturbance that may change due to a change in the rotational speed of the FAN. Therefore, the magnetic disk device 1 can improve the reliability.

Next, a magnetic disk device according to another embodiment of the first embodiment will be described. In the another embodiment, the same reference numerals are attached to the same parts as those in the first embodiment, and a detailed description thereof will be omitted.

Second Embodiment

The magnetic disk device 1 according to the second embodiment is different from the magnetic disk device 1 according to the first embodiment described above in terms of the configuration of the variable delay memory unit A3.

Figure 16:
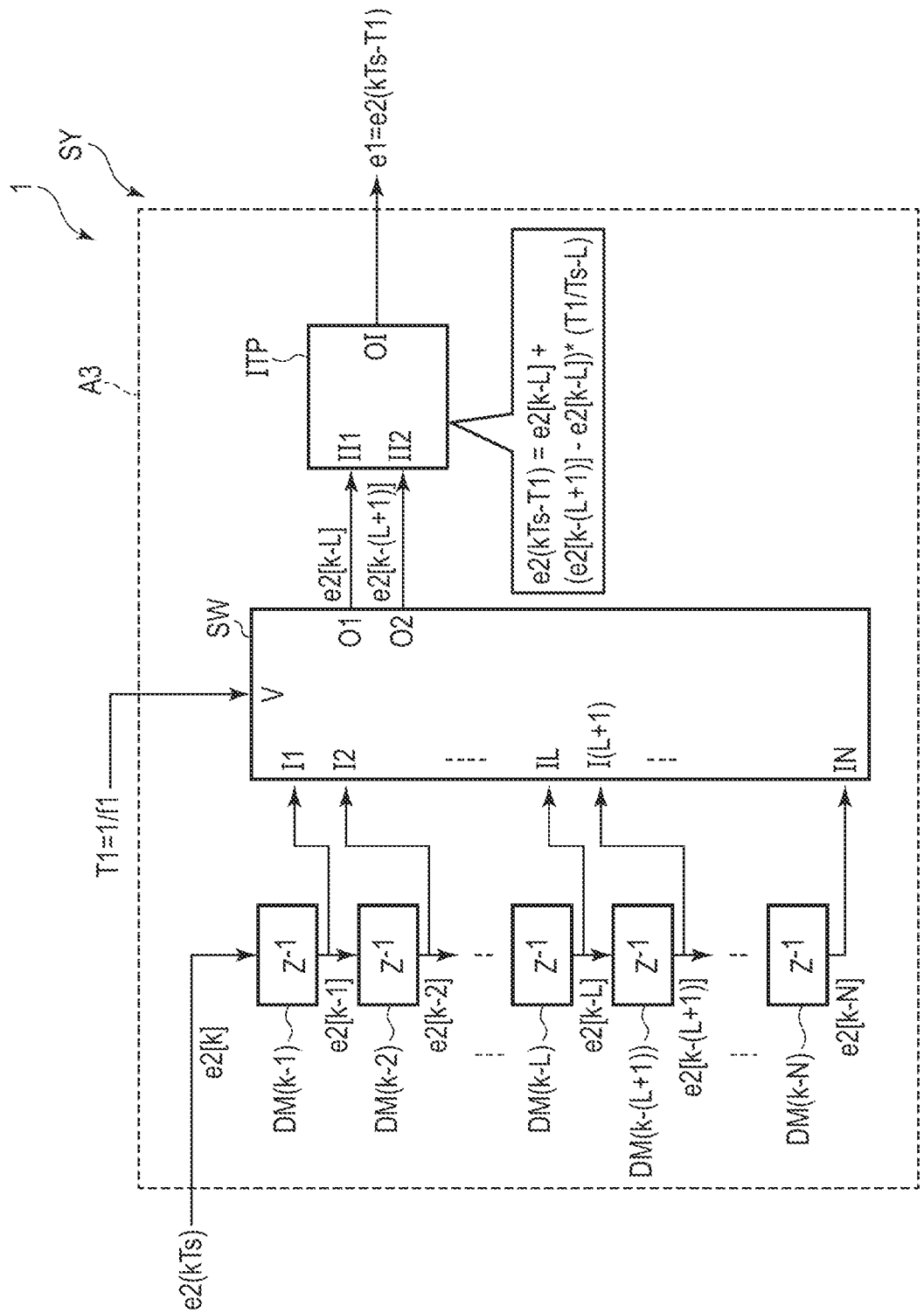
FIG. 16 is a block diagram illustrating an example of a variable delay memory unit according to the second embodiment.

FIG. 16 is a block diagram illustrating an example of a variable delay memory unit A3 according to the second embodiment.

The variable delay memory unit A3 includes memory units DM(k–1), DM(k–2), DM(k–3), . . . , DM(k–L), . . . , DM(k–N), a delay selector SW, and an interpolator ITP. The variable delay memory unit A3 illustrated in FIG. 16 corresponds to the variable delay memory unit A3 illustrated in FIGS. 3, 5, and 6.

For example, the delay memory DM(k–1) receives the delay memory input signal e2[$k$]=e2(kTs) of the k-th sample, and stores (or records) the delay memory input signal e2[$k$]=e2(kTs) of the k-th sample as the immediately previous past sample value e2[$k$–1]. Here, Ts is a sampling period. Similarly to the delay memory DM(k–1), the plurality of delay memories DM(k–2) to DM(k–N) each receives the immediately previous past sample value from the immediately previous delay memory, and sequentially updates and stores (or records) the input past sample value as a new past sample value.

The delay selector SW selects a particular past sample value from the past sample values e2[$k$–1] to e2[$k$–N] recorded in the memory units DM(k–1) to DM(k–N), respectively. The delay selector SW outputs the selected particular past sample value. For example, the delay selector SW selects, from the delay sample values e2[$k$–1] to e2[$k$–N] recorded in the memory units DM(k–1) to DM(k–N), respectively, delay sample values e2[$k$–L] and e2[$k$–(L+1)] respectively corresponding to the number of delay samples L and L+1 calculated by dividing the delay time T1 by the sampling period Ts and rounding down decimal places according to the delay time T1 corresponding to the reciprocal of the fundamental frequency f1 corresponding to the harmonic disturbance to be currently compensated for input to the terminal V. For example, L≤T1/Ts<L+1. For example, the delay selector SW outputs the selected delay sample values (delay memory output signals) e2[$k$–L] and e2[$k$–(L+1)] to the interpolator ITP.

The interpolator ITP applies an interpolation operation. The interpolator ITP receives the delay memory output signal e2[$k$–L] via the input terminal II1 connected to the output terminal OI of the delay selector SW, and receives the delay memory output signal e2[$k$–(L+1)] via the input terminal II2 connected to the output terminal O2 of the delay selector SW.

The interpolator ITP estimates the output signal (hereinafter, may be referred to as an interpolation delay memory output signal) e2(kTs–T1) at the number of delay samples T1/Ts, which is a real value, by, for example, an interpolation operation using the following Equation (1) using the delay memory output signal e2[$k$–L] (=e2((k–L)Ts)) and the delay memory output signal e2[$k$–(L+1)](=e2((k–(L+1))Ts).

$$e2(kTs-T1)e2[k-L]+(e2[k-(L+1)]-e2[k-L])\times(T1/Ts-L) \quad \text{(Equation 1)}$$

The interpolator ITP outputs an interpolation delay memory output signal e1=e2(kTs–T1) via the output terminal OI.

Figure 17:
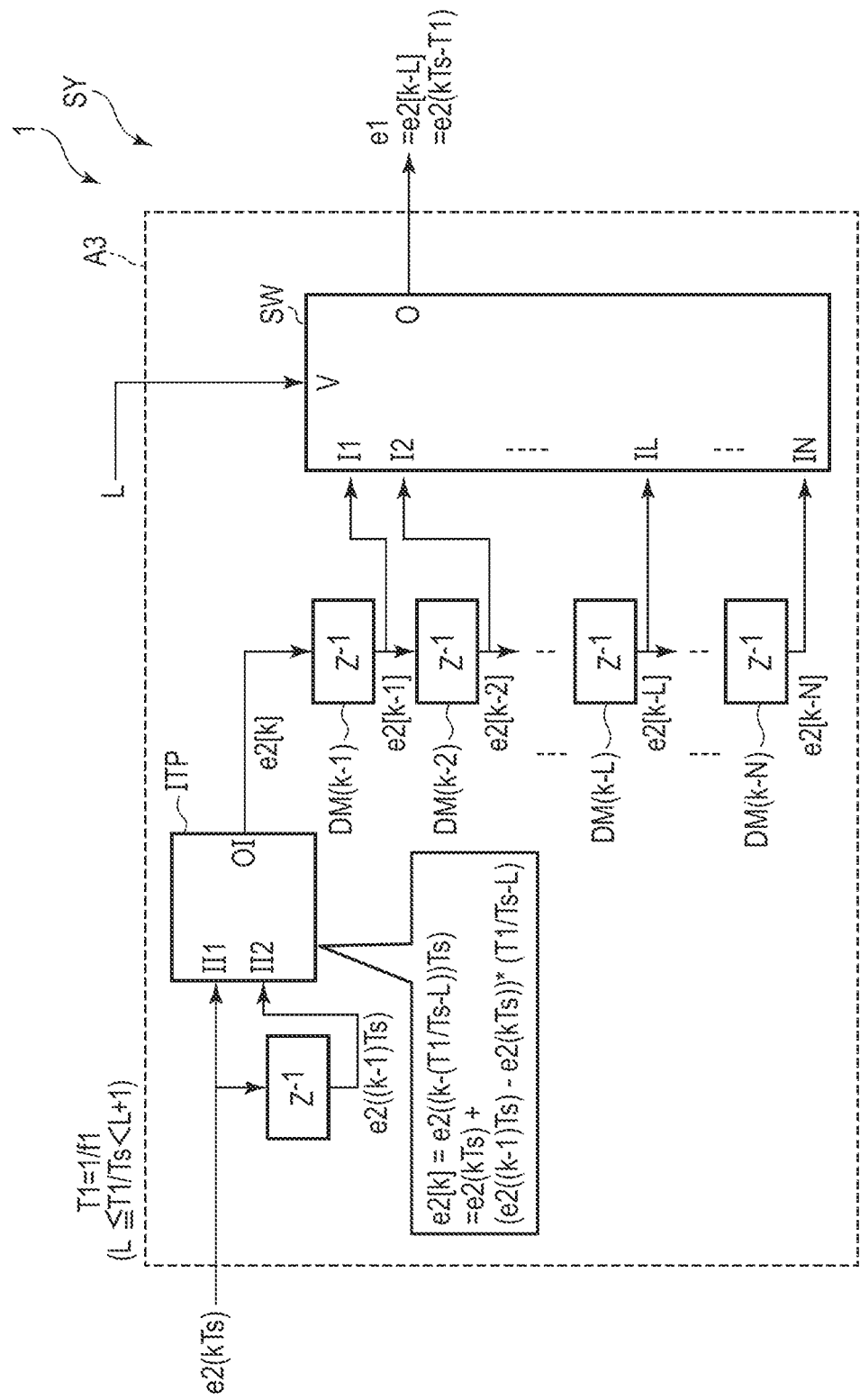
FIG. 17 is a block diagram illustrating an example of a variable delay memory unit according to the second embodiment.

FIG. 17 is a block diagram illustrating an example of a variable delay memory unit A3 according to the second embodiment.

The variable delay memory unit A3 includes a delay memory DM((k–1)Ts), memory units DM(k–1), DM(k–2), DM(k–3), . . . , DM(k–L), . . . , DM(k–N), a delay selector SW, and an interpolator ITP. The variable delay memory unit A3 illustrated in FIG. 17 corresponds to the variable delay memory unit A3 illustrated in FIGS. 3, 5, and 6.

The delay memory DM((k–1)Ts) corresponds to the sampling period Ts. The delay memory DM((k–1)Ts) receives the delay memory input signal e2[$k$]=e2(kTs) of the k-th sample, and is stores (or records) the delay memory input signal e2[k]=e2(kTs) as the immediately previous sample value (hereinafter, may be referred to as a delay memory input signal) e2((k−1)Ts). The delay memory DM((k−1)Ts) is connected to the input terminal 112 of the interpolator ITP.

The interpolator ITP receives the delay memory input signal e2[k]=e2(kTs) via the input terminal I1, and receives the sample value e2((k−1)Ts) via the input terminal 112 connected to the delay memory DM((k−1)Ts). Since the number of delay samples L is determined according to the delay time T1, the interpolator ITP estimates the past input signal (hereinafter, may be referred to as an interpolation delay memory input signal) e2[k]=e2((k−(T1/Ts−L))Ts) for the fraction T1/Ts−L of the delay memory input signal e2[k]=e2(kTs) by, for example, an interpolation operation using the following Equation (2) using the delay memory input signal e2[k]=e2(kTs) and the delay memory input signal e2((k−1)Ts). In other words, since the number of delay samples L is determined according to the delay time T1, the interpolator ITP estimates the interpolation delay memory input signal delayed by decimal places (T1/Ts−L) of the value obtained by dividing the delay time by the sampling period from the delay memory input signal e2[k]=e2(kTs) and the delay memory input signal e2((kTs) by, for example, an interpolation operation using the following Equation (2) using the delay memory input signal e2[k]=e2(kTs) and the delay memory input signal e2((k−1)Ts).

$$e2(k-(T1/Ts-L)Ts) = e2(kTs) + ((e2(k-1)Ts) - e2(kTs)) \times (T1/Ts-L)$$ (Equation 2)

where L≤T1/Ts<L+1.

The interpolator ITP outputs the interpolation delay memory input signal e2[k] e2((k−(T1/Ts−L))Ts) to the delay memory DM(k−1) (or the memory unit) via the output terminal OI connected to the delay memory DM(k−1).

For example, the delay memory DM(k−1) receives the interpolation delay memory input signal e2[k]=e2((k−(T1/Ts−L))Ts) of the k-th sample, and stores (or records) the interpolation delay memory input signal e2[k]=e2((k−(T1/Ts−L))Ts) of the k-th sample as the immediately previous past sample value e2[k−1]. Similarly to the delay memory DM(k−1), the plurality of delay memories DM(k−2) to DM(k−N) each receives the immediately previous past sample value from the immediately previous delay memory, and sequentially updates and stores (or records) the input past sample value as a new past sample value.

For example, the delay selector SW selects the delay sample value e2[k−L] corresponding to the number of delay samples L from the past sample values e2[k−1] to e2[k−N] recorded in the memory units DM(k−1) to DM(k−N) according to the delay time T1 input to the terminal V. For example, the delay selector SW outputs the selected delay sample value (delay memory output signal) e2[k−L]=e2(kTs−T1). That is, the delay selector SW outputs the delay memory output signal e2(kTs−T1) delayed from the delay memory input signal e2(kTs) by the delay time T1.

Figure 18:
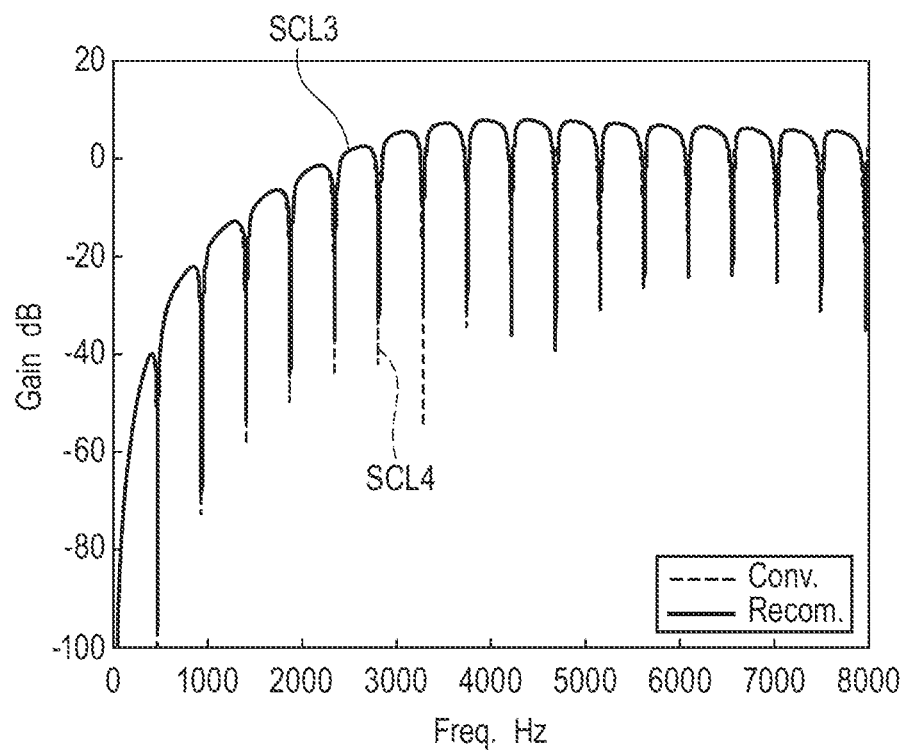
FIG. 18 is a diagram illustrating an example of a change in sensitivity characteristic of the positioning control system according to the second embodiment.

FIG. 18 is a diagram illustrating an example of a change in sensitivity characteristic of the positioning control system SY according to the second embodiment. FIG. 18 corresponds to FIG. 16 or 17. In FIG. 18, the horizontal axis represents the frequency (Hz) and the vertical axis represents the gain (dB). FIG. 18 illustrates a change SCL3 in the sensitivity characteristic (or gain) with respect to the frequency in a case where the repetitive control system RC including the variable delay memory unit A3 having the interpolator ITP is applied to the harmonic of (the estimated value of) the fundamental frequency (hereinafter, may be referred to as a target suppression fundamental frequency) f1=470 Hz that is the target of suppression corresponding to the harmonic disturbance, and a change SCL4 in the sensitivity characteristic (or gain) with respect to the frequency in a case where the repetitive control system RC including the variable delay memory unit A3 having no interpolator ITP is applied to the harmonic of (the estimated value of) the target suppression fundamental frequency f1=470 Hz corresponding to the harmonic disturbance. In the example illustrated in FIG. 18, the change SCL3 in the sensitivity characteristic (or gain) with respect to the frequency is indicated by a solid line. The change SCL4 in the sensitivity characteristic (or gain) with respect to the frequency is indicated by a broken line. The repetitive control system RC of the second embodiment is applied to the change SCL3 in sensitivity characteristic (or gain) with respect to frequency. The repetitive control system RC of the first embodiment is applied to the change SCL4 in sensitivity characteristic (or gain) with respect to frequency.

In the example illustrated in FIG. 18, in both the case of the change SCL3 in the impression characteristic with respect to the frequency and the case of the change SCL4 in the sensitivity characteristic with respect to the frequency, the harmonics of a frequency in the vicinity of the target suppression fundamental frequency (=estimated value) f1=470 Hz corresponding to the harmonic disturbance are suppressed (or compensated).

Figure 19:
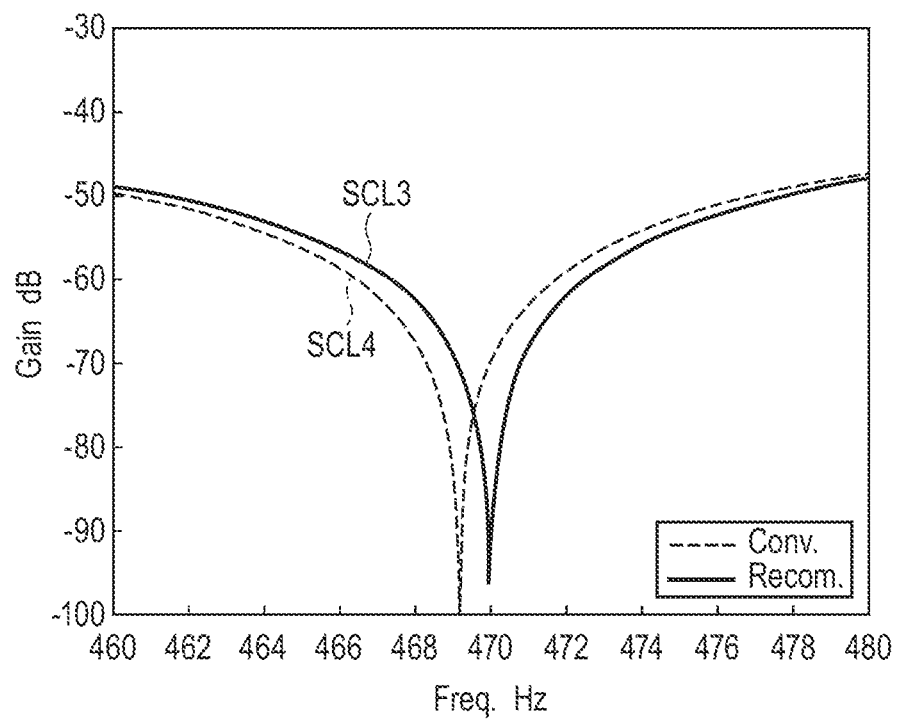
FIG. 19 is an enlarged view in which a waveform of a frequency in the vicinity of the target suppression fundamental frequency of FIG. 18 is enlarged.

FIG. 1.9 is an enlarged view in which a waveform of a frequency in the vicinity of the target suppression fundamental frequency f1=470 Hz in FIG. 18 is enlarged. FIG. 19 corresponds to FIG. 18. In FIG. 19, the horizontal axis represents the frequency (Hz) and the vertical axis represents the gain (dB). In FIG. 19, the servo sample frequency fs=62.4 kHz.

In the example illustrated in FIG. 19, in the change SCL4 in the sensitivity characteristic (or gain) with respect to the frequency, the number of delay samples is fs/f1=132.76, and L=133 rounded off as an integer value. When the number of delay samples L=133, the repetitive control system suppresses (or compensates for) the frequency f1'=fs/L=469.2 Hz. In other words, in the example illustrated in the change SCL4 in the sensitivity characteristic (or gain) with respect to the frequency, the repetitive control system suppresses (or compensates for) the frequency f1'=fs/L=469.2 Hz. An error occurs between the frequency f1'=469.2 Hz and the target suppression fundamental frequency f1=470 Hz. On the other hand, in the example illustrated in the change SCL3 in the sensitivity characteristic (or gain) with respect to the frequency, the repetitive control system RC can suppress (or compensate for) the frequency substantially coincident with the target suppression fundamental frequency f1=470 Hz.

FIG. 20 is an enlarged view in which a waveform of a frequency in the vicinity of a frequency of 7050 Hz which is the 15th order harmonic of the target suppression fundamental frequency f1 in FIG. 18 is enlarged. FIG. 20 corresponds to FIG. 18. In FIG. 20, the horizontal axis represents the frequency (Hz) and the vertical axis represents the gain (dB).

In the example illustrated in FIG. 20, in the change SCL4 in the sensitivity characteristic (or gain) with respect to the frequency, the repetitive control system suppresses (or compensates for) the frequency of 15×f1'=7038 Hz corresponding to the 15th order harmonic. An error occurs between the frequency 15×f1'=7038 Hz corresponding to the 15th order harmonic and a target harmonic frequency (hereinafter, may be referred to as a target suppression frequency) 15×f1=7050 Hz to be suppressed corresponding to the 15th order harmonic. On the other hand, in the example illustrated in the change SCL3 in the sensitivity characteristic (or gain) with respect to the frequency, the repetitive control system RC can suppress (or compensate for) the disturbance with the frequency substantially coincident with the target suppression frequency 15×f1=7050 Hz corresponding to the 15th order harmonic. The target suppression frequency includes a target suppression fundamental frequency.

FIG. 21 is a diagram illustrating a suppression frequency error between the frequency of the harmonic suppressed in the change in the sensitivity characteristic with respect to the two frequencies illustrated in FIGS. 18, 19, and 20 and the target suppression frequency. FIG. 21 corresponds no FIGS. 18, 19 and 20. In FIG. 21, the horizontal axis represents the frequency (Hz), and the vertical axis represents the error (hereinafter, may be referred to as a suppression frequency error) of the actually suppressed frequency with respect to the target suppression frequency. FIG. 21 illustrates a suppression frequency error SCE3 at each frequency between each frequency suppressed in the change SCL3 in the sensitivity characteristic with respect to the frequency illustrated in FIGS. 18 to 20 and each target frequency, and a suppression frequency error SCE4 at each frequency between each frequency suppressed in the change SCL4 in the sensitivity characteristic with respect to the frequency illustrated in FIGS. 18 to 20 and each target frequency. In FIG. 21, the suppression frequency error SCE3 at each frequency is indicated by a circle, and the suppression frequency error SCE4 at each frequency is indicated by a triangle.

As illustrated in FIG. 21, the suppression frequency error SCE4 at each frequency approximates the target suppression frequency at low frequencies corresponding to the low order harmonic, but is greatly away from the target suppression frequency at high frequencies corresponding to the high order harmonic. The suppression frequency error SCE3 at each frequency approximates the target suppression frequency even at low frequencies corresponding to the low order harmonic, and approximates the target suppression frequency even at high frequencies corresponding to the high-order harmonic. Therefore, it can be seen that the effect of applying the repetitive control system RC of the second embodiment is exhibited particularly at high frequencies corresponding to the high order harmonic.

Figure 22:
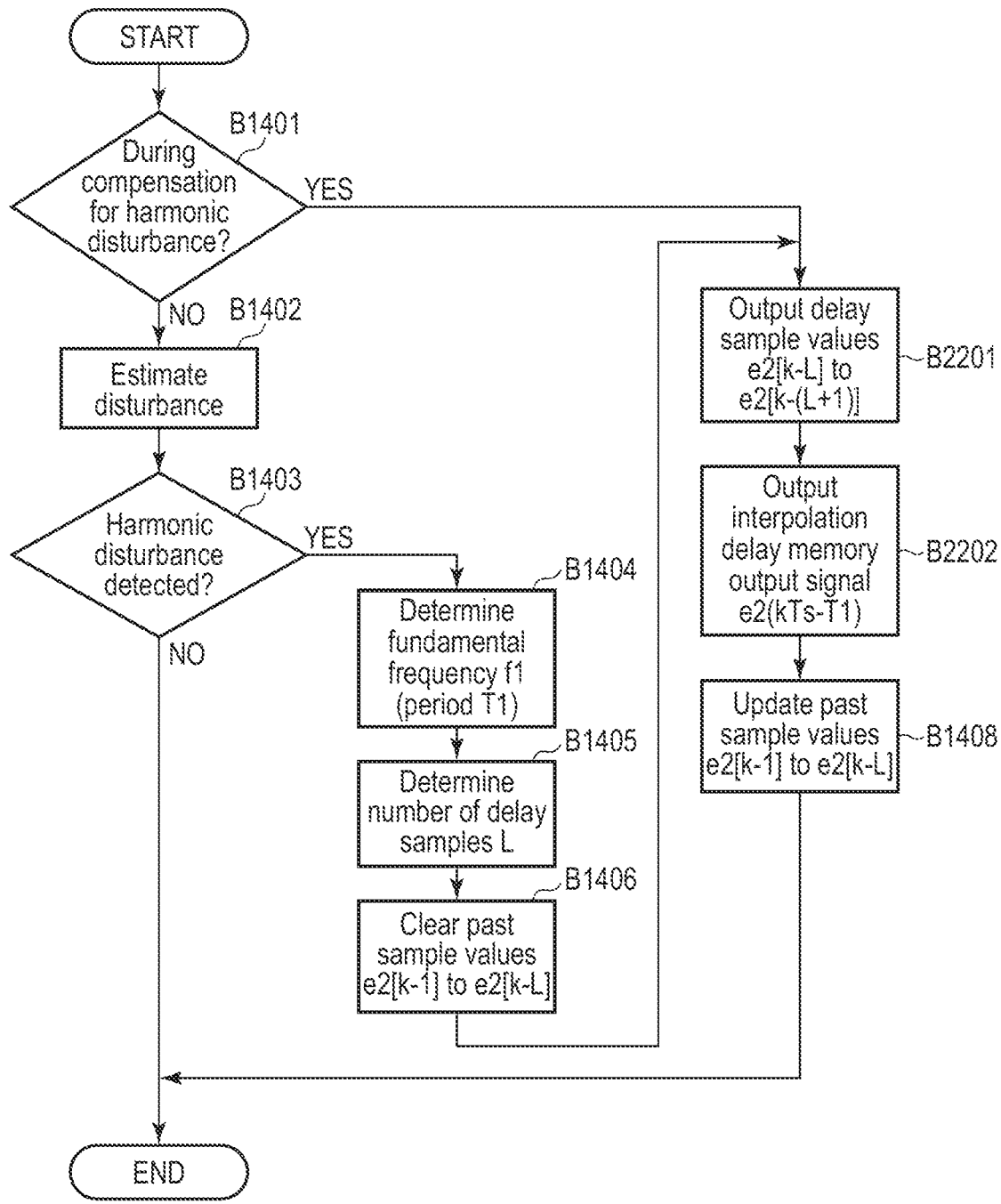
FIG. 22 is a flowchart illustrating an example of a method of compensating for a harmonic corresponding to a harmonic disturbance according to the second embodiment.

FIG. 22 is a flowchart illustrating an example of a method of compensating for a harmonic corresponding to a harmonic disturbance according to the second embodiment. FIG. 22 corresponds to FIG. 16.

When it is determined that the number of delay samples L has already been determined and the harmonic disturbance is being compensated for (YES in B1401), the MPU 60 outputs the delay sample values e2[$k$–L] and e2[$k$–(L+1)] from the selector SW in the repetitive control unit RC (B2201). The MPU 60 outputs an interpolation delay memory output signal e2(kTs–T1) estimated by, for example, an interpolation operation based on the delay sample values e2[$k$–L] and e2[$k$–(L+1)] (B2202). The MPU 60 sequentially updates the past sample values e2[$k$–1] to e2[$k$–L], updates the delay memory input signal e2[$k$] based on the new position error signal e0[$k$] and the current delay memory output signal e2[$k$–L] (B1408), and ends the process.

According to the second embodiment, when it is determined that the number of delay samples L has already been determined and the harmonic disturbance is being compensated for, the magnetic disk device 1 outputs the delay sample values e2[$k$–L] and e2[$k$–(L+1)] from the selector SW in the repetitive control unit RC, and outputs the interpolation delay memory output signal e2(kTs–T1) estimated by, for example, an interpolation operation based on the delay sample values e2[$k$–L] and e2[$k$–(L+1)]. The magnetic disk device 1 sequentially updates the past sample values e2[$k$–1] to e2[$k$–L], and updates the delay memory input signal e2[$k$] based on the new position error signal e0[$k$] and the current delay memory output signal e2[$k$–L]. Therefore, the magnetic disk device 1 can improve the reliability.

While certain embodiments have been described, these embodiments have been presented by way of example only, and are not intended to limit the scope of the inventions. Indeed, the novel embodiments described herein may be embodied in a variety of other forms, furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

An example of a magnetic disk device obtained from the configuration disclosed in the present specification will be additionally described below.

(1) A magnetic disk device including a disk, a head that writes data to the disk and reads data from the disk, an actuator that is rotationally driven and controls movement of the head mounted on the disk, and a controller that estimates a fundamental frequency of a position error signal generated in positioning control of the head, the fundamental frequency corresponding to a disturbance having harmonics, determines the fundamental frequency, determines the number of delay samples based on the fundamental frequency, and suppresses the disturbance with a plurality of multiplied frequencies that is a harmonic of the fundamental frequency according to the number of the delay samples.

(2) The magnetic disk device according to (1), wherein the controller calculates the number of the delay samples as a ratio of a servo sample frequency to the fundamental frequency.

(3) The magnetic disk device according to (1) or (2), wherein the controller calculates the number of the delay samples as a round-up integer value or a round-down integer value of a ratio of a servo sample frequency to the fundamental frequency.

(4) The magnetic disk device according to any one of (1) to (3), wherein the controller re-estimates the fundamental frequency when the disturbance changes, re-determines the fundamental frequency, and re-determines the number of the delay samples based on the re-determined fundamental frequency.

(5) The magnetic disk device according to (4), wherein when detecting deterioration of the position error signal, the controller determines that the frequency characteristic of the disturbance has changed and re-estimates the fundamental frequency.

(6) The magnetic disk device according to any one of (1) to (5), wherein the controller includes a repetitive control system including an arithmetic unit that outputs an internal state signal obtained by adding an output signal according to the number of the delay samples to the position error signal, and a memory unit that sequentially records the input internal state signal, receives the number of the delay samples, and outputs the output signal according to the number of the delay samples.

(7) The magnetic disk device according to (6), wherein
the controller includes a low pass filter connected to the arithmetic unit and the memory unit,
the arithmetic unit outputs the internal state signal to the low pass filter, and
the low pass filter outputs the internal state signal obtained by cutting or attenuating signal components equal to or higher than a first frequency to the memory unit.

(8) The magnetic disk device according to (7), wherein
the controller includes a phase compensator connected to the memory unit,
the memory unit outputs the output signal to the phase compensator, and
the phase compensator outputs the output signal obtained by applying phase compensation to the arithmetic unit.

(9) The magnetic disk device according to (1), wherein the controller outputs an interpolation output signal obtained by applying an interpolation operation based on an output signal according to the fundamental frequency, and applies positioning control based on the interpolation output signal.

(10) The magnetic disk device according to (9), wherein the controller calculates the number of the delay samples as an integer value obtained by rounding down a decimal point of a value obtained by dividing a delay time that is a reciprocal of the fundamental frequency by a sampling period.

(11) The magnetic disk device according to (9) or (10), wherein the controller calculates the interpolation output signal by applying a linear interpolation operation on a first output signal in the output signal according to the number of first delay samples among the number of the delay samples and a second output signal in the output signal according to the number of second delay samples after the number of the first delay samples by one sample period among the number of the delay samples.

(12) A method of compensating for a harmonic corresponding to a harmonic disturbance applied to a magnetic disk device including a disk, a head that writes data to the disk and reads data from the disk, and an actuator that is rotationally driven and controls movement of the head mounted on the disk, the method including
estimating a fundamental frequency of a position error signal generated in positioning control of the head, the fundamental frequency corresponding to a disturbance having harmonics,
determining the fundamental frequency,
determining the number of delay samples based on the fundamental frequency, and
suppressing the disturbance with a plurality of multiplied frequencies that is a harmonic of the fundamental frequency according to the number of the delay samples.

(13) A magnetic disk device including
a disk,
a head that writes data to the disk and reads data from the disk,
an actuator that is rotationally driven and controls movement of the head mounted on the disk, and
a controller that estimates a fundamental frequency of a position error signal generated in positioning control of the head, the fundamental frequency corresponding to a disturbance having harmonics, determines the fundamental frequency, determines the number of the delay samples based on the fundamental frequency, outputs an interpolation output signal obtained by an interpolation operation based on an output signal according to the fundamental frequency, and applies positioning control based on the interpolation output signal.

(14) The magnetic disk device according to (13), wherein the controller calculates the number of the delay samples as an integer value obtained by rounding down a decimal point of a value obtained by dividing a delay time that is a reciprocal of the fundamental frequency by a sampling period.

(15) The magnetic disk device according to (14), wherein the controller calculates the interpolation output signal by applying a linear interpolation operation on a first output signal in the output signal according to the number of first delay samples among the number of the delay samples and a second output signal in the output signal according to the number of second delay samples after the number of the first delay samples by one sample period among the number of the delay samples.

(16) The magnetic disk device according to (14), wherein the controller calculates the output signal according to a first internal state signal delayed from the position error signal by decimal places of a value obtained by dividing the delay time by the sampling period.

(17) The magnetic disk device according to (16), wherein the controller includes a repetitive control system including an arithmetic unit that outputs a second internal state signal obtained by adding an output signal according to the number of the delay samples to the position error signal, an interpolator that outputs the first internal state signal interpolated based on the second internal state signal and a third internal state signal after the second internal state signal by one sample period, and a memory unit that sequentially records the input first internal state signal, receives the number of the delay samples, and outputs the output signal according to the number of the delay samples.

What is claimed is:
1. A magnetic disk device comprising:
a disk;
a head that writes data to the disk and reads data from the disk;
an actuator that is rotationally driven and controls movement of the head mounted on the disk; and
a controller that estimates a fundamental frequency of a position error signal generated in positioning control of the head, the fundamental frequency corresponding to a disturbance having harmonics, determines the fundamental frequency, determines the number of delay samples based on the fundamental frequency, and suppresses the disturbance with a plurality of multiplied frequencies that is a harmonic of the fundamental frequency according to the number of the delay samples.

2. The magnetic disk device according to claim 1, wherein the controller calculates the number of the delay samples as a ratio of a servo sample frequency to the fundamental frequency.

3. The magnetic disk device according to claim 1, wherein the controller calculates the number of the delay samples as a round-up integer value or a round-down integer value of a ratio of a servo sample frequency to the fundamental frequency.

4. The magnetic disk device according to claim 1, wherein the controller re-estimates the fundamental frequency when the disturbance changes, re-determines the fundamental frequency, and re-determines the number of the delay samples based on the re-determined fundamental frequency.

5. The magnetic disk device according to claim 4, wherein when detecting deterioration of the position error signal, the controller determines that the frequency characteristic of the disturbance has changed and re-estimates the fundamental frequency.

6. The magnetic disk device according to claim 1, wherein the controller includes a repetitive control system including an arithmetic unit that outputs an internal state signal obtained by adding an output signal according to the number of the delay samples to the position error signal, and a memory unit that sequentially records the input internal state signal, receives the number of the delay samples, and outputs the output signal according to the number of the delay samples.

7. The magnetic disk device according to claim 6, wherein
the controller includes a low pass filter connected to the arithmetic unit and the memory unit,
the arithmetic unit outputs the internal state signal to the low pass filter, and
the low pass filter outputs the internal state signal obtained by cutting or attenuating signal components equal to or higher than a first frequency to the memory unit.

8. The magnetic disk device according to claim 7, wherein
the controller includes a phase compensator connected to the memory unit,
the memory unit outputs the output signal to the phase compensator, and
the phase compensator outputs the output signal obtained by applying phase compensation to the arithmetic unit.

9. The magnetic disk device according to claim 1, wherein the controller outputs an interpolation output signal obtained by applying an interpolation operation based on an output signal according to the fundamental frequency, and applies positioning control based on the interpolation output signal.

10. The magnetic disk device according to claim 9, wherein the controller calculates the number of the delay samples as an integer value obtained by rounding down decimal places of a value obtained by dividing a delay time that is a reciprocal of the fundamental frequency by a sampling period.

11. The magnetic disk device according to claim 9, wherein the controller calculates the interpolation output signal by applying a linear interpolation operation on a first output signal in the output signal according to the number of first delay samples among the number of the delay samples and a second output signal in the output signal according to the number of second delay samples after the number of the first delay samples by one sample period among the number of the delay samples.

12. A method of compensating for a harmonic corresponding to a harmonic disturbance applied to a magnetic disk device including a disk, a head that writes data to the disk and reads data from the disk, and an actuator that is rotationally driven and controls movement of the head mounted on the disk, the method comprising:
estimating a fundamental frequency of a position error signal generated in positioning control of the head, the fundamental frequency corresponding to a disturbance having harmonics;
determining the fundamental frequency;
determining the number of delay samples based on the fundamental frequency; and
suppressing the disturbance with a plurality of multiplied frequencies that is a harmonic of the fundamental frequency according to the number of the delay samples.

13. The method of compensating for a harmonic corresponding to a harmonic disturbance according to claim 12, further comprising calculating the number of the delay samples as a ratio of a servo sample frequency to the fundamental frequency.

14. The method of compensating for a harmonic corresponding to a harmonic disturbance according to claim 12, further comprising calculating the number of the delay samples as a round-up integer value or a round-down integer value of a ratio of a servo sample frequency to the fundamental frequency.

15. The method of compensating for a harmonic corresponding to a harmonic disturbance according to claim 12, further comprising:
re-estimating the fundamental frequency when the disturbance changes,
re-determining the fundamental frequency, and
re-determining the number of the delay samples based on the re-determined fundamental frequency.

16. The method of compensating for a harmonic corresponding to a harmonic disturbance according to claim 15, further comprising:
determining, when detecting deterioration of the position error signal, that the frequency characteristic of the disturbance has changed, and
re-estimating the fundamental frequency.

17. The method of compensating for a harmonic corresponding to a harmonic disturbance according to claim 12, wherein
the magnetic disk device includes a repetitive control system including
an arithmetic unit that outputs an internal state signal obtained by adding an output signal according to the number of the delay samples to the position error signal, and
a memory unit that sequentially records the input internal state signal, receives the number of the delay samples, and outputs the output signal according to the number of the delay samples.

18. The method of compensating for a harmonic corresponding to a harmonic disturbance according to claim 17, wherein
the magnetic disk device includes a low pass filter connected to the arithmetic unit and the memory unit,
the arithmetic unit outputs the internal state signal to the low pass filter, and
the low pass filter outputs the internal state signal obtained by cutting or attenuating signal components equal to or higher than a first frequency to the memory unit.

19. The method of compensating for a harmonic corresponding to a harmonic disturbance according to claim 18, wherein
the magnetic disk device includes a phase compensator connected to the memory unit,
the memory unit outputs the output signal to the phase compensator, and
the phase compensator outputs the output signal obtained by applying phase compensation to the arithmetic unit.

20. The method of compensating for a harmonic corresponding to a harmonic disturbance according to claim 12, further comprising: outputting an interpolation output signal obtained by applying an interpolation operation based on an output signal corresponding to the fundamental frequency, and applying positioning control based on the interpolation output signal.

* * * * *